(12) United States Patent
Hanaoka et al.

(10) Patent No.: US 11,946,551 B2
(45) Date of Patent: Apr. 2, 2024

(54) VALVE MECHANISM AND LIQUID EJECTING SYSTEM

(71) Applicant: SEIKO EPSON CORPORATION, Tokyo (JP)

(72) Inventors: Yukihiro Hanaoka, Shiojiri (JP); Toshiro Murayama, Fujimi-machi (JP); Daiki Tatsuta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 981 days.

(21) Appl. No.: 16/884,321

(22) Filed: May 27, 2020

(65) Prior Publication Data
US 2020/0378406 A1    Dec. 3, 2020

(30) Foreign Application Priority Data
May 29, 2019  (JP) ................. 2019-100422

(51) Int. Cl.
| F16K 17/06 | (2006.01) |
| F15B 1/26 | (2006.01) |
| F15B 7/06 | (2006.01) |
| F16K 17/08 | (2006.01) |
| F16K 17/10 | (2006.01) |
| F16K 31/06 | (2006.01) |

(Continued)

(52) U.S. Cl.
CPC .............. *F16K 17/06* (2013.01); *F15B 1/265* (2013.01); *F15B 7/06* (2013.01); *F16K 17/085* (2013.01); *F16K 17/087* (2013.01); *F16K 17/10* (2013.01); *F16K 17/105* (2013.01); *F16K 31/0655* (2013.01); *G05D 16/0636* (2013.01); *G05D 16/0655* (2013.01); *G05D 16/0661* (2013.01); *G05D 16/0663* (2013.01);
(Continued)

(58) Field of Classification Search
CPC .. F16K 17/06; F16K 31/1262; F16K 31/0655; F16K 17/105; F16K 17/085; F16K 17/087; F16K 17/10; B41J 2/175; B41J 2/17596; G05D 16/0661; G05D 16/0655; G05D 16/0636; G05D 16/0663; G05D 16/0669
See application file for complete search history.

(56) References Cited

U.S. PATENT DOCUMENTS

| 1,874,293 A | * | 8/1932 | Charles ............. G05D 16/2095 |
| | | | 137/505.37 |
| 2,286,713 A | * | 6/1942 | Burks ................... F16K 17/085 |
| | | | 137/469 |

(Continued)

FOREIGN PATENT DOCUMENTS

| CN | 107020820 | 8/2017 |
| JP | 2011-110851 | 6/2011 |

(Continued)

*Primary Examiner* — Atif H Chaudry
(74) *Attorney, Agent, or Firm* — WORKMAN NYDEGGER

(57) ABSTRACT

A first valve mechanism is a valve mechanism provided in a flow path coupled to a liquid ejecting head that ejects a liquid, and including a valve that opens/closes the flow path, a first communication liquid chamber that communicates with the flow path, and a first pressure receiving body that converts a pressure difference between a pressure of the first communication liquid chamber and a reference pressure into an operating force of the valve, in which a threshold pressure of the first communication liquid chamber for determining opening/closing of the valve is variable.

11 Claims, 11 Drawing Sheets

(51) Int. Cl.
    *G05D 16/06*     (2006.01)
    *F15B 21/06*     (2006.01)

(52) U.S. Cl.
    CPC .......... *G05D 16/0669* (2013.01); *F15B 21/06* (2013.01); *F15B 2201/51* (2013.01)

(56) References Cited

U.S. PATENT DOCUMENTS

| | | | | |
|---|---|---|---|---|
| 4,638,837 | A * | 1/1987 | Buike | B62D 5/06 |
| | | | | 251/129.05 |
| 4,809,015 | A * | 2/1989 | Bowling | B41J 2/175 |
| | | | | 347/49 |
| 5,383,646 | A * | 1/1995 | Weingarten | F16K 7/17 |
| | | | | 251/30.02 |
| 9,844,948 | B2 * | 12/2017 | Ando | B41J 2/18 |
| 2013/0021416 | A1 | 1/2013 | Yokoyama et al. | |
| 2013/0286114 | A1 * | 10/2013 | Ito | B41J 2/175 |
| | | | | 347/89 |
| 2013/0293604 | A1 | 11/2013 | Nitta et al. | |
| 2017/0087867 | A1 | 3/2017 | Sato et al. | |
| 2018/0056663 | A1 * | 3/2018 | Asawa | F04B 53/10 |
| 2018/0099509 | A1 | 4/2018 | Sato et al. | |
| 2018/0201023 | A1 | 7/2018 | Sato et al. | |

FOREIGN PATENT DOCUMENTS

| | | |
|---|---|---|
| JP | 2013-107403 | 6/2013 |
| JP | 2017-061091 | 3/2017 |

* cited by examiner

VALVE MECHANISM AND LIQUID EJECTING SYSTEM

The present application is based on, and claims priority from JP Application Serial Number 2019-100422, filed May 29, 2019, the disclosure of which is hereby incorporated by reference herein in its entirety.

BACKGROUND

1. Technical Field

The present disclosure relates to a valve mechanism including a valve coupled to a flow path of a liquid ejecting head which ejects a liquid, the valve opening/closing the flow path, and a liquid ejecting system including the valve mechanism.

2. Related Art

For a liquid ejecting head which ejects a liquid, in order to discharge bubbles contained in the liquid, to suppress thickening of the liquid, and to suppress precipitation of components contained in the liquid, for example, a liquid ejecting system that circulates the liquid inside the liquid ejecting head is proposed (for example, refer to JP-A-2013-107403).

In such a liquid ejecting system, the pressure of a circulation system is controlled by detecting the pressure of the liquid and controlling a pump based on the detection result.

However, as in JP-A-2013-107403, when the pressure of the liquid is detected and the pump is controlled based on the detection result to control the pressure of the circulation system, there is a problem in that the pressure control becomes complicated.

SUMMARY

An advantage of some aspects of the present disclosure is to provide a valve mechanism and a liquid ejecting system capable of simplifying pressure control.

According to an aspect of the present disclosure, there is provided a valve mechanism provided in a flow path coupled to a liquid ejecting head that ejects a liquid, including a valve that opens/closes the flow path, a communication liquid chamber that communicates with the flow path, and a pressure receiving body that converts a pressure difference between a pressure of the communication liquid chamber and a reference pressure into an operating force of the valve, in which a threshold pressure of the communication liquid chamber for determining opening/closing of the valve is variable.

According to another aspect of the present disclosure, there is provided a liquid ejecting system including a liquid ejecting head that ejects a liquid, a circulation flow path formed together with a flow path inside the liquid ejecting head, and a valve mechanism provided in a middle of the circulation flow path, in which the valve mechanism includes a first valve mechanism that is provided in an upstream flow path positioned upstream of the liquid ejecting head and that opens/closes a valve at a first threshold pressure, and a second valve mechanism that is provided in a downstream flow path positioned downstream of the liquid ejecting head and that opens/closes the valve at a second threshold pressure lower than the first threshold pressure.

DESCRIPTION OF EXEMPLARY EMBODIMENTS

Hereinafter, the present disclosure will be described in detail based on embodiments.

First Embodiment

Figure 1:
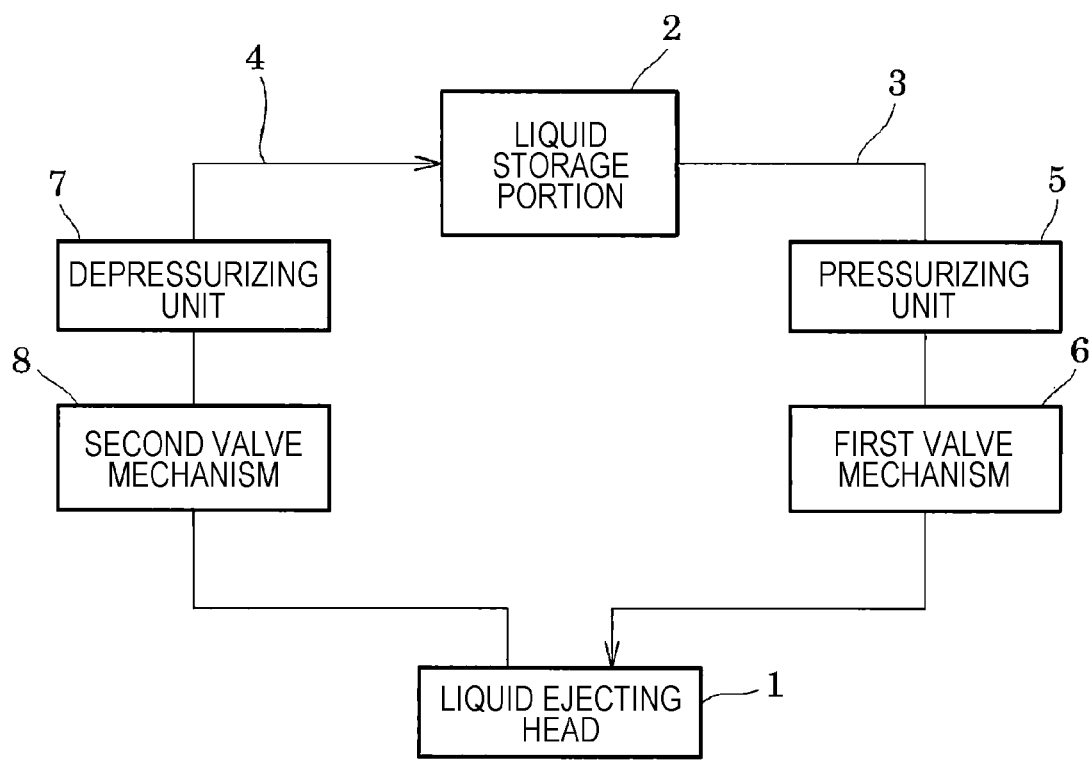
FIG. 1 is a block diagram illustrating a configuration of a liquid ejecting system.
Figure 2:
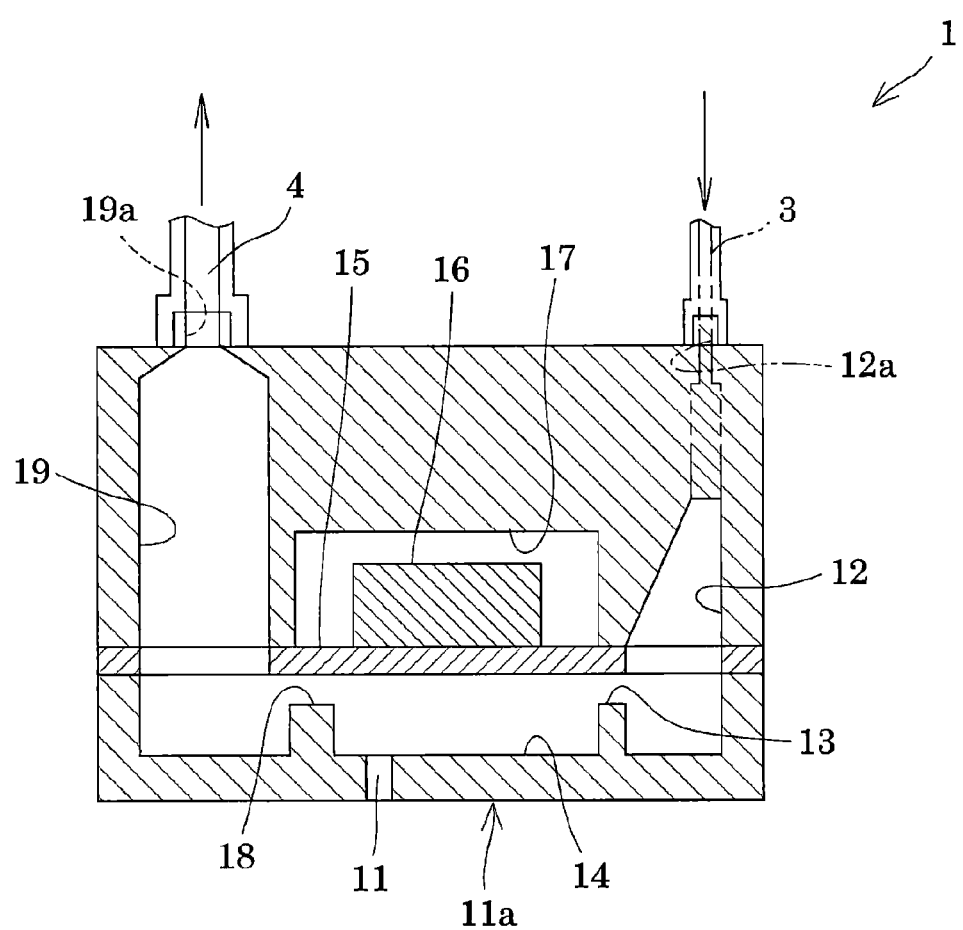
FIG. 2 is a sectional diagram of a liquid ejecting head.

FIG. 1 is a schematic diagram illustrating the configuration of a liquid ejecting system according to a first embodiment of the present disclosure. FIG. 2 is a sectional diagram of the liquid ejecting head.

As illustrated in FIG. 1, the liquid ejecting system is provided with a liquid ejecting head 1, a liquid storage portion 2, a supply flow path 3, and a recovery flow path 4. In the liquid ejecting system of the present embodiment, the liquid from the liquid storage portion 2 is supplied to the liquid ejecting head 1 via the supply flow path 3, and the liquid from the liquid ejecting head 1 is recovered to the liquid storage portion 2 via the recovery flow path 4. In other words, the circulation of the liquid is performed between the liquid ejecting head 1 and the liquid storage portion 2. The supply flow path 3, the recovery flow path 4, and the flow path inside the liquid ejecting head 1 configure a circulation flow path for circulating the liquid between the liquid storage portion 2 and the liquid ejecting head 1.

The liquid storage portion 2 stores the liquid. The liquid storage portion 2 may be a liquid tank which may be filled with a liquid, or alternatively, may be a detachable liquid cartridge.

As illustrated in FIG. 2, the liquid ejecting head 1 is provided with a nozzle surface 11a in which a plurality of nozzles 11 capable of ejecting the liquid as droplets are opened. The liquid ejecting head 1 is provided with a first common liquid chamber 12 to which the liquid is supplied. An inlet 12a coupled to the supply flow path 3 is opened in the first common liquid chamber 12. In other words, the supply flow path 3 is an upstream flow path which is coupled to the inlet 12a of the liquid ejecting head 1 and supplies the liquid to the liquid ejecting head 1.

The liquid ejecting head 1 is provided with a plurality of pressure chambers 14 which communicate with the first common liquid chamber 12 via a first communication path 13. The first communication path 13 and the pressure chamber 14 are provided for each of the nozzles 11. A portion of the wall surface of the pressure chamber 14 is formed by a diaphragm 15.

The liquid ejecting head 1 is provided with a plurality of actuators 16 corresponding to the plurality of pressure chambers 14. Each of the actuators 16 is provided on a surface of the diaphragm 15 opposite to a portion of the diaphragm 15 facing the pressure chamber 14. Each of the actuators 16 is held inside a holding chamber 17 arranged at a different position from that of the first common liquid chamber 12.

The liquid ejecting head 1 causes a change in pressure of the liquid inside each of the pressure chambers 14 by driving each of the actuators 16 to eject the liquid from each of the nozzles 11 as droplets.

The actuators 16 are pressure generating units which cause pressure changes in the liquid inside the pressure chambers 14. In the present embodiment, a piezoelectric actuator which is deformed by the application of a drive voltage is used as the actuator 16. It is possible to use, as the piezoelectric actuator, a thin-film type piezoelectric actuator formed by film formation and lithography, a thick-film type piezoelectric actuator formed using a method such as attaching a green sheet, or a longitudinal vibration type piezoelectric actuator which is obtained by alternately laminating a piezoelectric material and an electrode forming material and which expands and contracts in axial directions.

The liquid ejecting head 1 includes a second common liquid chamber 19 that communicates with each of the pressure chambers 14 via a second communication path 18. A recovery port 19a coupled to the recovery flow path 4 is opened in the second common liquid chamber 19. In other words, the recovery flow path 4 is a downstream flow path which is coupled to the recovery port 19a of the liquid ejecting head 1 and recovers the liquid from the liquid ejecting head 1.

The supply flow path 3 includes a pressurizing unit 5 and a first valve mechanism 6.

The pressurizing unit 5 pressurizes and supplies the liquid from the liquid storage portion 2 downstream, that is, toward the liquid ejecting head 1 and is formed of a pressurizing pump. The liquid from the liquid storage portion 2 is pressurized by the pressurizing unit 5 and supplied to the first valve mechanism 6.

The first valve mechanism 6 is a member that is provided in the middle of the supply flow path 3 which couples the pressurizing unit 5 and the liquid ejecting head 1 to each other and that opens/closes the supply flow path 3. The pressurizing unit 5 is coupled upstream of the first valve mechanism 6 and the liquid ejecting head 1 is coupled downstream of the first valve mechanism 6. The details of the first valve mechanism 6 will be described later.

The recovery flow path 4 includes a depressurizing unit 7 and a second valve mechanism 8.

The depressurizing unit 7 depressurizes the liquid downstream of the liquid ejecting head 1 and recovers the liquid from the liquid ejecting head 1 to the liquid storage portion 2, and is formed of a suction pump such as a vacuum pump.

The second valve mechanism 8 is a member that is provided in the middle of the recovery flow path 4 which couples the depressurizing unit 7 and the liquid ejecting head 1 to each other and that opens/closes the recovery flow path 4. The liquid ejecting head 1 is coupled upstream of the second valve mechanism 8 and the liquid storage portion 2 is coupled downstream of the second valve mechanism 8. The details of the second valve mechanism 8 will be described later.

Figure 3:
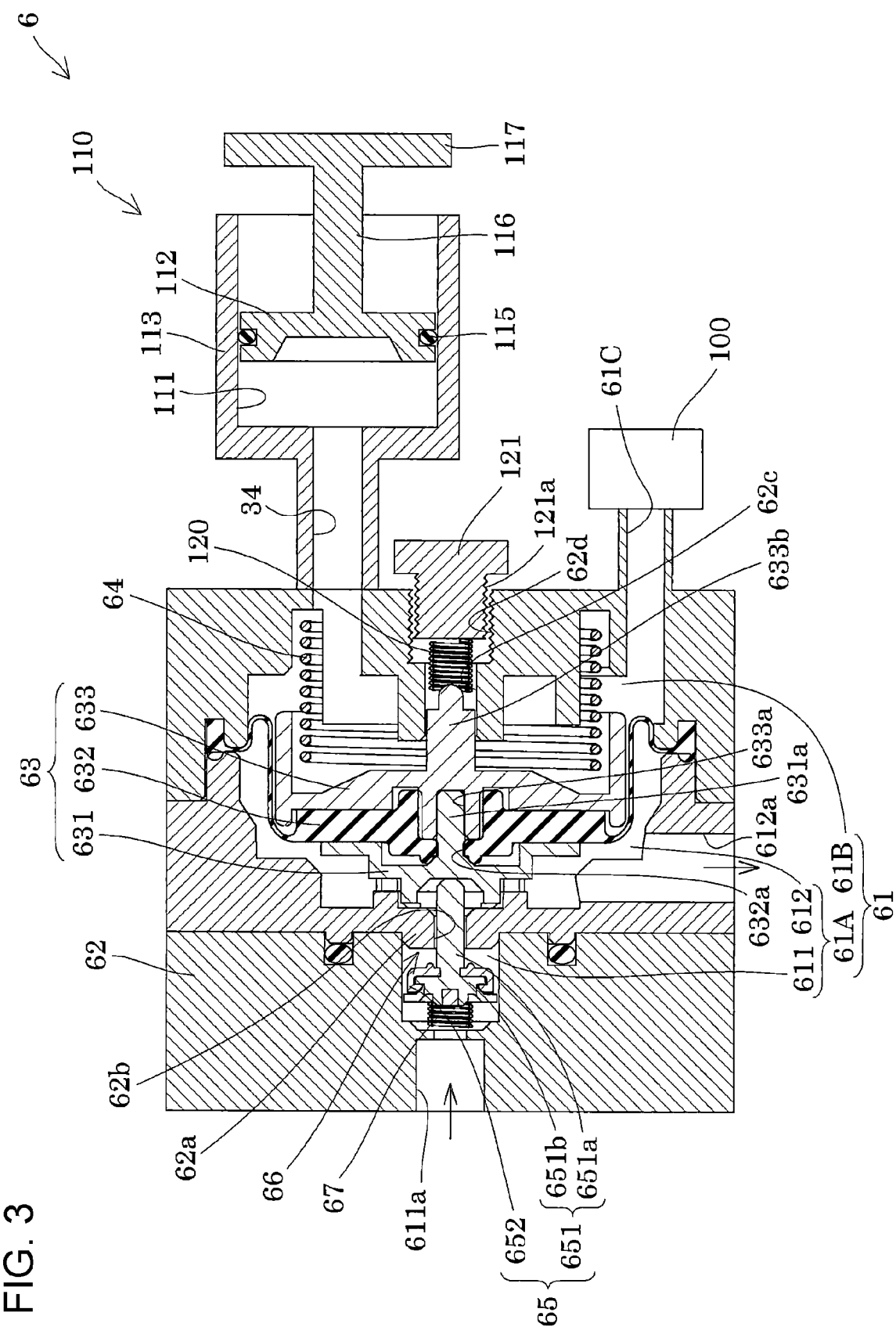
FIG. 3 is a sectional diagram of a first valve mechanism.
Figure 4:
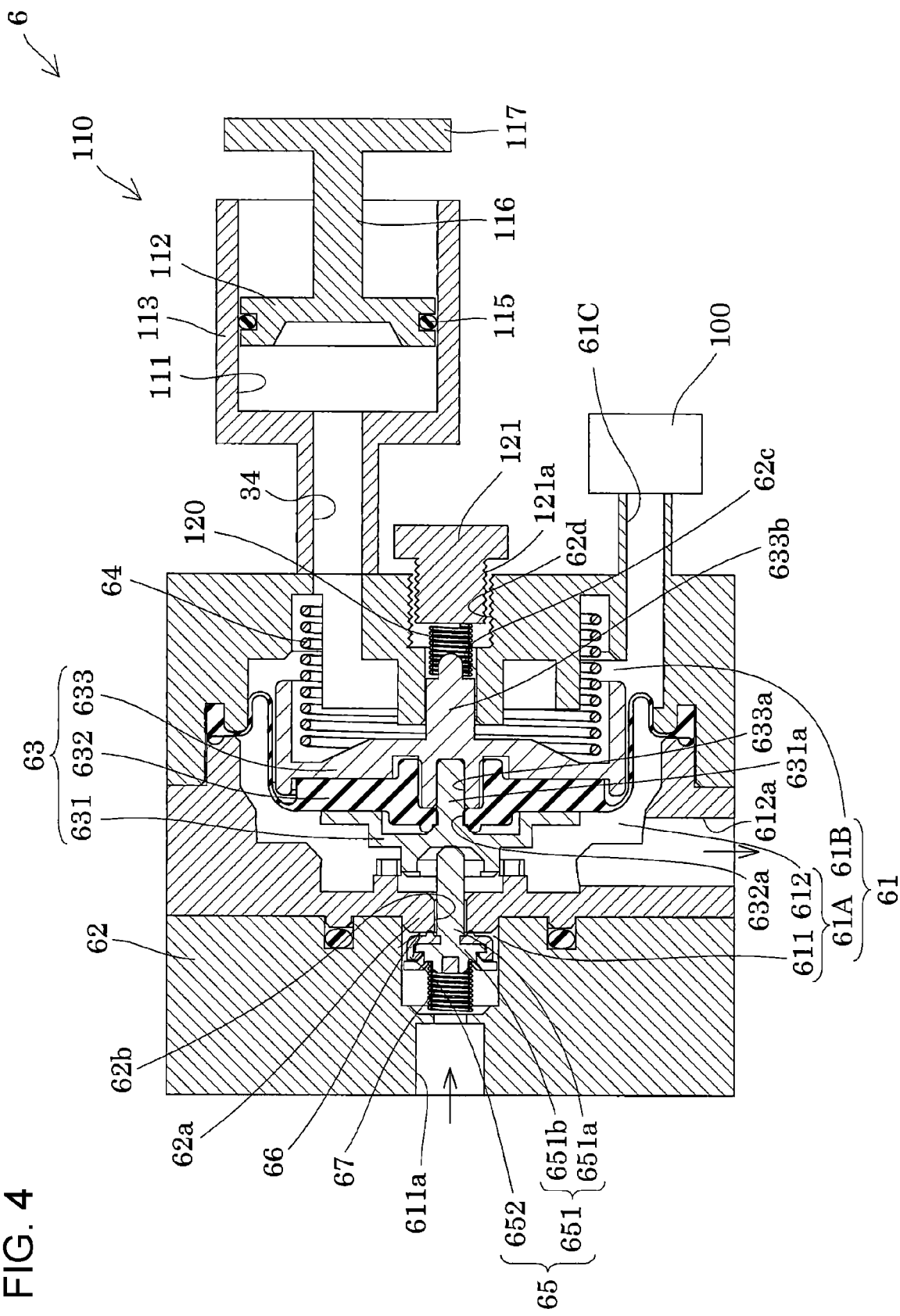
FIG. 4 is a sectional diagram of the first valve mechanism.
Figure 5:
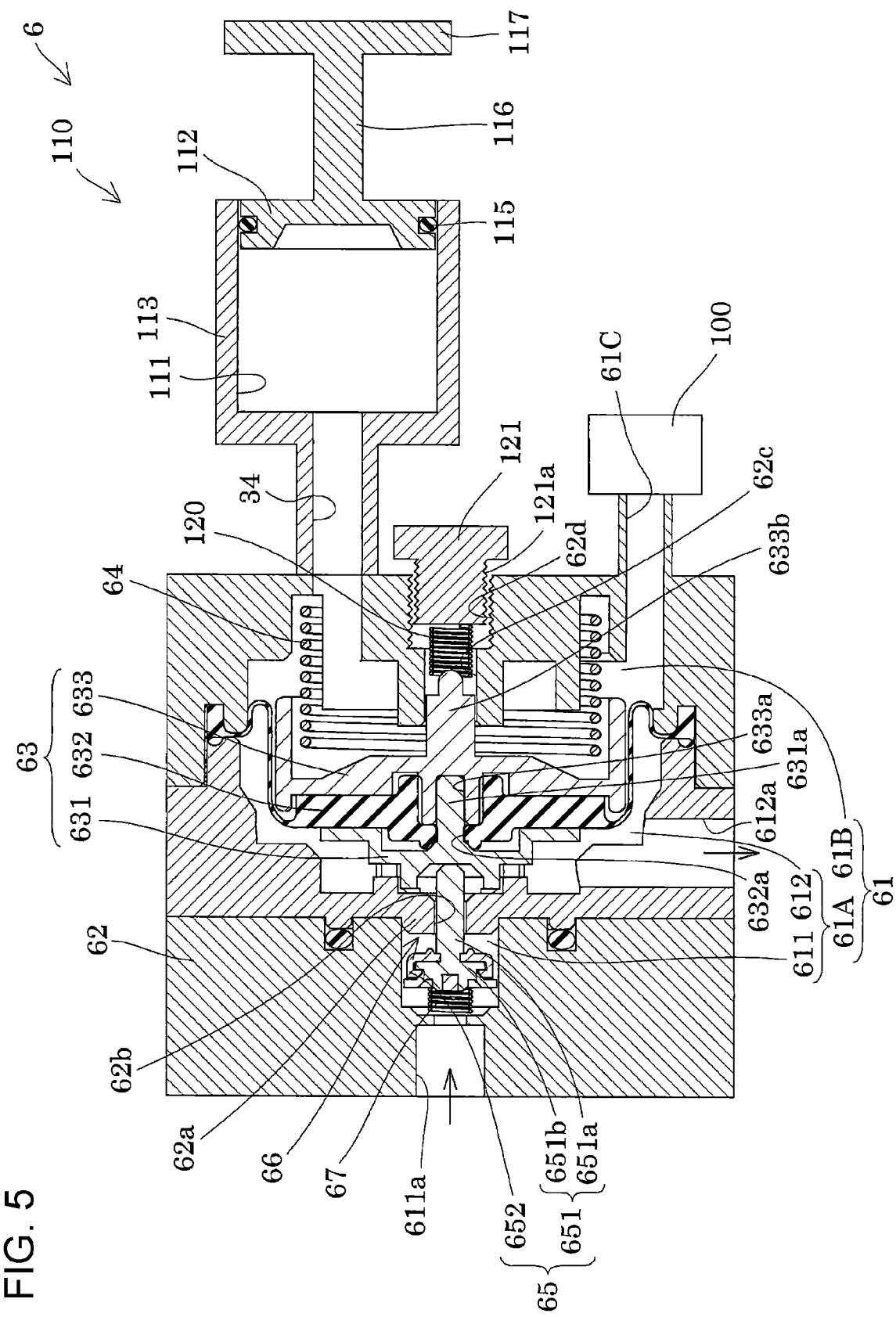
FIG. 5 is a sectional diagram illustrating operations of a first variable-volume mechanism.
Figure 6:
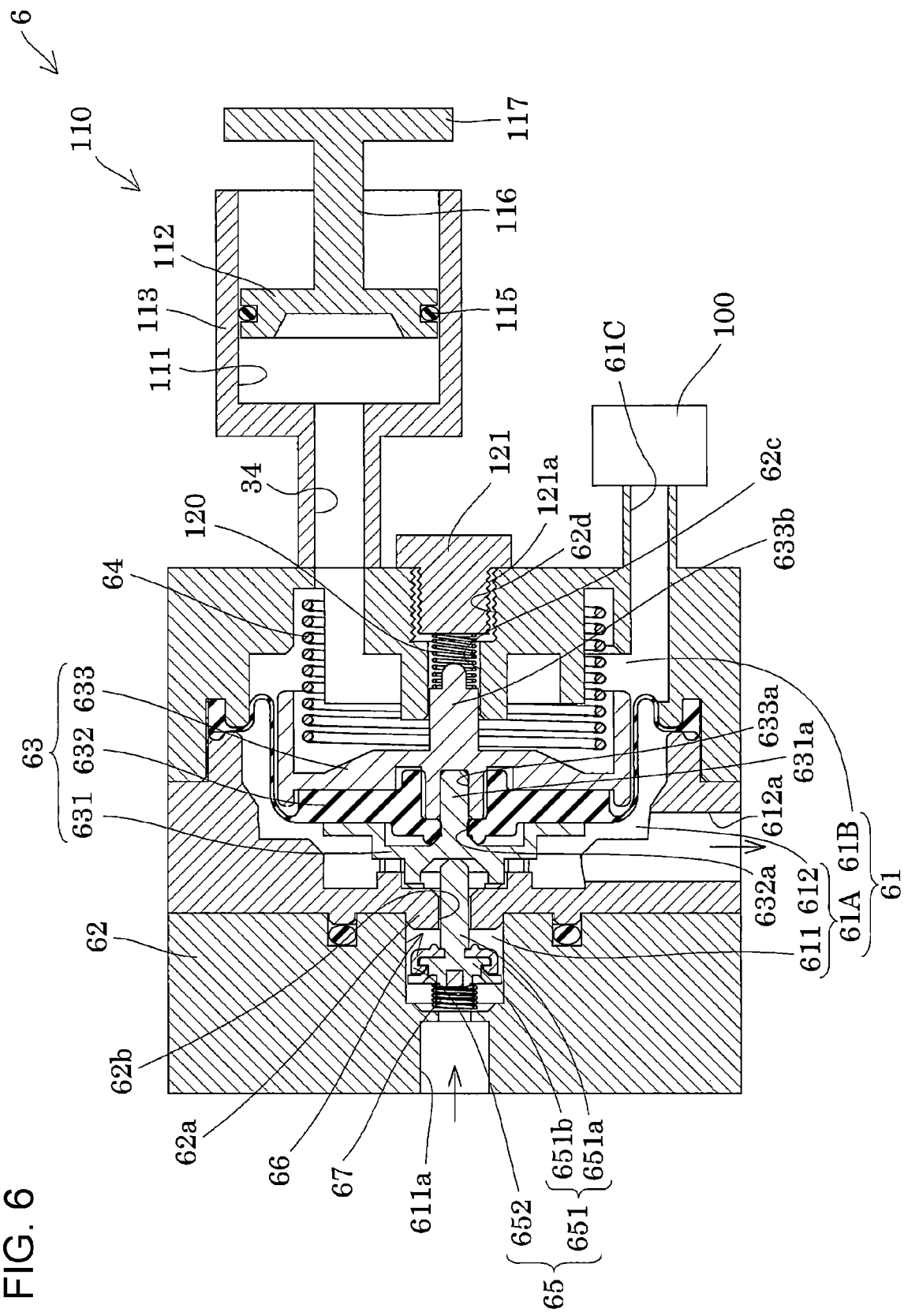
FIG. 6 is a sectional diagram illustrating operations of a first elastic body and a first support member.

Here, the first valve mechanism 6 will be further described with reference to FIGS. 3 to 6. FIG. 3 is a sectional diagram of the first valve mechanism in a valve closed state according to the first embodiment of the present disclosure. FIG. 4 is a sectional diagram of the first valve mechanism in a valve open state. FIG. 5 is a sectional diagram describing the operations of a first variable-volume mechanism. FIG. 6 is a sectional diagram describing the operations of the first elastic body and the first support member.

As illustrated in FIGS. 3 and 4, the first valve mechanism 6 includes a first main body portion 62 having a first storage chamber 61. The first main body portion 62 is formed by laminating a plurality of members, in the present embodiment, three members. The first main body portion 62 may be formed at low cost by molding using a resin material. Naturally, the material forming the first main body portion 62 is not limited thereto and may be formed of a metal material. The number of members configuring the first main body portion 62 is not limited to this number. For example, the first main body portion 62 may be formed of one member and may be formed of two or more members.

A first pressure receiving body 63 is provided in the first storage chamber 61 and the first storage chamber 61 is partitioned into two rooms by the first pressure receiving body 63. One of the rooms of the first storage chamber 61 partitioned by the first pressure receiving body 63 is a first liquid chamber 61A filled with the liquid, and the other room is a first air chamber 61B not filled with the liquid. The volumes of the first liquid chamber 61A and the first air chamber 61B change in accordance with the operation of the first pressure receiving body 63.

The first pressure receiving body 63 includes a first pressure receiving portion 631, a first flexible portion 632, and a first spring receiving portion 633.

The first pressure receiving body 63 is formed by interposing a center portion of the first flexible portion 632 between the first pressure receiving portion 631 and the first spring receiving portion 633 from both sides.

The first pressure receiving portion 631 is provided inside the first liquid chamber 61A. The first spring receiving portion 633 is provided inside the first air chamber 61B. The first liquid chamber 61A and the first air chamber 61B are partitioned by the first flexible portion 632.

The first flexible portion 632 is formed of a plate-shaped elastic material formed of a rubber or an elastomer, or a film-shaped resin material. The first flexible portion 632 of the present embodiment is made of rubber. A first through hole 632a penetrating the first flexible portion 632 in the thickness direction is provided in the center portion of the first flexible portion 632. The first pressure receiving portion 631 and the first spring receiving portion 633 are fixed to each other via a first through hole 632a. Specifically, the first pressure receiving portion 631 is provided with a first fixing pin 631a inserted into the first through hole 632a. The first spring receiving portion 633 is provided with a first fixing hole 633a into which the first fixing pin 631a is inserted and fixed. The first fixing pin 631a provided on the first pressure receiving portion 631 is inserted into the first through hole 632a from the first liquid chamber 61A side and a leading end of the first fixing pin 631a is inserted into the first fixing hole 633a from the first air chamber 61B side to fix the first pressure receiving portion 631 and the first spring receiving portion 633 to each other in a state in which the first flexible portion 632 is interposed therebetween. Since the first fixing pin 631a has an outer diameter slightly larger than the inner diameter of the first through hole 632a, the first fixing pin 631a and the first through hole 632a closely adhere to each other and leaking of the liquid inside the first liquid chamber 61A into the first air chamber 61B via the first through hole 632a is suppressed.

The end portion of the first flexible portion 632 is fixed to the inner wall surface of the first storage chamber 61 of the first main body portion 62 along the circumferential direction. In the present embodiment, the end portion of the first flexible portion 632 is fixed by being interposed between two stacked members which configure the first main body portion 62. The first flexible portion 632 in the present embodiment is a so-called bellowphragm and is a film in which the space between the end portion fixed to the first main body portion 62 and the portion interposed between and the first pressure receiving portion 631 and the first spring receiving portion 633 has a structure which is folded back in the direction in which the first liquid chamber 61A and the first air chamber 61B are lined up inside the first storage chamber 61. By providing the first flexible portion 632 folded back in this manner, the first flexible portion 632 may be easily deformed with a small force. In other words, it is possible to move the first pressure receiving portion 631 and the first spring receiving portion 633 in the direction in which the first liquid chamber 61A and the first air chamber 61B are lined up with a relatively small force by rolling the first flexible portion 632 so that the folded-back portion returns to the original orientation. Incidentally, for example, when the first flexible portion 632 is provided without being folded back, it is necessary to deform the first flexible portion 632 to extend the first flexible portion 632 in order to move the first pressure receiving portion 631 and the first spring receiving portion 633, and a relatively large force is necessary as compared to the case in which the first flexible portion 632 is folded back.

By deforming the first flexible portion 632, the first pressure receiving body 63 is capable of moving the first pressure receiving portion 631 and the first spring receiving portion 633 in a direction which partitions the first liquid chamber 61A and the first air chamber 61B from each other.

The first air chamber 61B communicates with the atmosphere via a first atmosphere communication path 61C provided in the first main body portion 62. In other words, one end of the first atmosphere communication path 61C is opened to the first air chamber 61B and the other end is opened to the outside of the first main body portion 62. As will be described in detail later, a first opening/closing mechanism 100 that opens/closes the first atmosphere communication path 61C is provided at an opening of the first atmosphere communication path 61C to the outside of the first main body portion 62. In this manner, it is possible to open or seal the first air chamber 61B with respect to the atmosphere by providing the first opening/closing mechanism 100 in the first atmosphere communication path 61C and opening/closing the first atmosphere communication path 61C using the first opening/closing mechanism 100.

A first pressure receiving body spring 64 is provided inside the first air chamber 61B between the first spring receiving portion 633 and the first main body portion 62. The first pressure receiving body spring 64 is a biasing member which biases the first pressure receiving body 63 toward the first liquid chamber 61A. The first pressure receiving body spring 64 of the present embodiment is formed of a compression coil spring. One end of the first pressure receiving body spring 64 abuts against the first spring receiving portion 633 and the other end of the first pressure receiving body spring 64 abuts against the inner wall surface of the first air chamber 61B of the first main body portion 62. Accordingly, the first pressure receiving body spring 64 biases the first pressure receiving body 63 in a direction which reduces the volume of the first liquid chamber 61A. In other words, the first pressure receiving body 63 is biased by the first pressure receiving body spring 64 to deform the first flexible portion 632 and move the first flexible portion 632 in a direction which reduces the volume of the first liquid chamber 61A. The biasing member which biases the first pressure receiving body 63 is not limited to the first pressure receiving body spring 64 formed of a compression coil spring and may be another spring such as a plate spring and may be an elastic body such as a rubber or an elastomer.

The first liquid chamber 61A includes a first supply chamber 611 and a first communication liquid chamber 612.

A first inflow port 611a coupled to the supply flow path 3 is opened in the first supply chamber 611. The liquid pressurized by the pressurizing unit 5 is supplied to the first supply chamber 611 from the first inflow port 611a.

A portion of the wall of the first communication liquid chamber 612 is formed by the first pressure receiving body 63. The first communication liquid chamber 612 and the first supply chamber 611 are partitioned by a first wall portion 62a of the first main body portion 62.

A first outflow port 612a coupled to the supply flow path 3 is opened in the first communication liquid chamber 612. The liquid inside the first communication liquid chamber 612 is supplied to the liquid ejecting head 1 from the first outflow port 612a.

The first supply chamber 611 is provided with a valve including a first valve body 65 and a first valve seat 66. Specifically, the first wall portion 62a that partitions the first communication liquid chamber 612 and the first supply chamber 611 from each other is provided with a first communication port 62b which causes the first communication liquid chamber 612 and the first supply chamber 611 to communicate with each other. The liquid from the first supply chamber 611 flows into the first communication liquid chamber 612 via the first communication port 62b. The surface on the first supply chamber 611 side of the first wall portion 62a in which the first communication port 62b is opened serves as the first valve seat 66. In other words, the first valve seat 66 includes the first communication port 62b as a hole serving as a liquid flow path. Although not particularly illustrated, the first valve seat 66 is provided with a liquid-repellent film having a property of repelling liquid, that is, a liquid-repellent property. The liquid-repellent film may be a film directly formed on the first valve seat 66, a member on which the liquid-repellent film is provided may be fixed to the first main body portion 62, and the member provided with the liquid-repellent film may be used as the first valve seat 66. By providing the liquid-repellent film on the first valve seat 66 in this manner, the first valve body 65 repeatedly comes into contact with the first valve seat 66, and thereby, it is possible to suppress the accumulation of components contained in the liquid. Accordingly, it is possible to suppress the occurrence of poor adherence between the first valve seat 66 and the first valve body 65 caused by the accumulation of the components of the liquid and to suppress the leakage of the liquid in the valve closed state.

The first valve body 65 includes a first fixing member 651 and a first elastic member 652.

The first fixing member 651 is formed of a metal or a resin having a high rigidity, that is, a high Young's modulus as compared to the first elastic member 652.

The first fixing member 651 includes a first shaft portion 651a and a first flange portion 651b.

The first shaft portion 651a is formed of a columnar member having an outer diameter smaller than the inner diameter of the first communication port 62b. The first shaft portion 651a is capable of moving relative to the first wall portion 62a in the axial direction of the first shaft portion 651a in a state in which the first shaft portion 651a is inserted into the first communication port 62b.

One end of the first shaft portion 651a inside the first communication liquid chamber 612 abuts against the center portion of the first pressure receiving portion 631 inside the first communication liquid chamber 612.

The other end of the first shaft portion 651a opposite to the one end abutting against the first pressure receiving portion 631 is positioned inside the first supply chamber 611. The first flange portion 651b is formed integrally with the other end of the first shaft portion 651a inside the first supply chamber 611.

The first flange portion 651b is formed of a disk-shaped member having an outer diameter larger than the inner diameter of the first communication port 62b.

A first valve body spring 67 which is a biasing member is provided between the first flange portion 651b and the first main body portion 62. The first valve body spring 67 of the present embodiment is formed of a compression coil spring. The first valve body 65 is biased by the first valve body spring 67 toward the first communication liquid chamber 612 with the axial direction of the first shaft portion 651a as the movement direction. By providing the first valve body spring 67 in this manner, when the first pressure receiving body 63 does not press the first valve body 65 in the valve opening direction, it is possible to use the first valve body spring 67 to bias the first valve body 65 in the valve closing direction and cause the first valve body 65 to come into contact with the first valve seat 66 to close the valve. The biasing member which biases the first valve body 65 is not limited to the first valve body spring 67 formed of a compression coil spring and may be another spring such as a plate spring and may be an elastic body such as a rubber or an elastomer.

The first elastic member 652 is formed of a rubber or an elastomer having a lower Young's modulus than the first fixing member 651.

The first elastic member 652 is provided on a surface of the first flange portion 651b facing the first valve seat 66. In the present embodiment, the first elastic member 652 is provided on the outer periphery of the first flange portion 651b on a portion other than that against which the first valve body spring 67 abuts.

In the first valve mechanism 6, the forces acting on the first valve body 65 include the reaction force of the first flexible portion 632, the biasing force of the first pressure receiving body spring 64, the force acting on the first pressure receiving body 63 due to a pressure difference between the pressure inside the first communication liquid chamber 612 and the reference pressure inside the first air chamber 61B, and the biasing force of the first valve body spring 67. Although the reaction force of the first flexible portion 632 is a force for the deformed first flexible portion 632 to return to the original shape, the reaction force is very small due to using the bellowphragm as the first flexible portion 632.

The force acting on the first pressure receiving body 63 due to the pressure difference between the pressure inside the first communication liquid chamber 612 and the reference pressure inside the first air chamber 61B is equal to the product of the pressure difference between the pressure inside the first communication liquid chamber 612 and the reference pressure inside the first air chamber 61B and the area of the first pressure receiving body 63. Here, the pressure inside the first communication liquid chamber 612 refers to the pressure of the liquid with which the first communication liquid chamber 612 is filled and is an absolute pressure. The reference pressure inside the first air chamber 61B refers to the pressure of the gas with which the first air chamber 61B is filled and is an absolute pressure. When the first air chamber 61B is open to the atmosphere through the first atmosphere communication path 61C, the reference pressure inside the first air chamber 61B becomes the atmospheric pressure.

When the pressure inside the first communication liquid chamber 612 becomes lower than the reference pressure inside the first air chamber 61B, a force caused by the pressure difference acts on the first pressure receiving body 63 in a direction which reduces the volume of the first communication liquid chamber 612. When the pressure inside the first communication liquid chamber 612 becomes higher than the reference pressure inside the first air chamber 61B, a force caused by the pressure difference acts on the first pressure receiving body 63 in a direction which increases the volume of the first communication liquid chamber 612.

The biasing force of the first pressure receiving body spring 64 is a force which biases the first valve body 65 in the valve opening direction via the first pressure receiving body 63. Therefore, the operating force of the first valve body 65 caused by the pressure difference between the pressure inside the first communication liquid chamber 612 and the reference pressure inside the first air chamber 61B is adjusted by the biasing force of the first pressure receiving body spring 64. For example, when the biasing force of the first valve body spring 67 is large, it is possible to move the first pressure receiving body 63 to close the valve in a case in which the pressure difference between the pressure inside the first communication liquid chamber 612 and the reference pressure inside the first air chamber 61B is relatively great.

The first valve body spring 67 is provided to bias the first valve body 65 against a concave portion provided at the center of the first pressure receiving body 63. The first valve body 65 is configured separately from the first pressure receiving body 63, and by providing the first valve body spring 67, the movement of the first valve body 65 is coupled with that of the first pressure receiving body 63 and the first valve body 65 moves in a direction which closes the valve in accordance with the movement of the first pressure receiving body 63.

According to this configuration, the opening/closing of the valve is performed when the pressure difference between the pressure inside the first communication liquid chamber 612 and the reference pressure inside the first air chamber 61B reaches a predetermined value. In the present disclosure, the pressure of the liquid inside the first communication liquid chamber 612 when opening/closing of the valve is performed is referred to as a threshold pressure.

In the first valve mechanism 6, as illustrated in FIG. 3, a gap is formed between the first valve body 65 and the first valve seat 66 and the liquid is pressurized and supplied into the first supply chamber 611 and the first communication liquid chamber 612 by the pressurizing unit 5 in a state in which the first communication port 62b is open, that is, the valve is open. Due to the pressure difference between the pressure of the liquid inside the first communication liquid chamber 612, which is increased by the supply of the liquid from the pressurizing unit 5 and the reference pressure inside the first air chamber 61B increasing, as illustrated in FIG. 4, the first pressure receiving body 63 is moved in a direction away from the first wall portion 62a against the biasing force of the first pressure receiving body spring 64. Accordingly, due to the first pressure receiving body 63, which restricted the movement of the first valve body 65 until this point, moving, the first valve body 65 is caused to move toward the first wall portion 62*a* by the biasing force of the first valve body spring 67, the first valve body 65 and the first valve seat 66 come into contact with each other, and the valve closes. By closing the valve in this manner, the pressurized supply of the liquid by the pressurizing unit 5 is performed only to the first supply chamber 611, and the pressurized supply is not performed to the first communication liquid chamber 612. Therefore, the inside of the first communication liquid chamber 612 reaches a threshold pressure which is the pressure when the valve is closed.

Due to the liquid inside the first communication liquid chamber 612 flowing downstream from the first outflow port 612*a* in a state in which the valve illustrated in FIG. 4 is closed, the pressure of the liquid inside the first communication liquid chamber 612 is reduced. As the pressure inside the first communication liquid chamber 612 decreases, the pressure difference between the pressure inside the first communication liquid chamber 612 and the reference pressure inside the first air chamber 61B becomes smaller than the biasing force of the first pressure receiving body spring 64, and thus, the first pressure receiving body 63 is caused to move toward the first wall portion 62*a* by the biasing force of the first pressure receiving body spring 64. As the first pressure receiving body 63 moves toward the first wall portion 62*a*, the first pressure receiving body 63 presses the first valve body 65 against the biasing force of the first valve body spring 67, and as illustrated in FIG. 3, a gap is formed between the first valve body 65 and the first valve seat 66, and the first communication port 62*b* opens, that is, the valve opens. In the first valve mechanism 6, the pressure inside the first communication liquid chamber 612 for closing the valve reaches the threshold pressure. In other words, when the pressure inside the first communication liquid chamber 612 reaches the threshold pressure, the valve closes, and when the pressure inside the first communication liquid chamber 612 falls below the threshold pressure, the valve opens. Therefore, since the inside of the first communication liquid chamber 612 is maintained at the threshold pressure, the liquid is supplied from the first valve mechanism 6 to the liquid ejecting head 1 at the threshold pressure.

As described above, due to the first valve mechanism 6 opening/closing the valve using the threshold pressure inside the first communication liquid chamber 612, it is possible to supply the liquid downstream at the threshold pressure inside the first communication liquid chamber 612. Therefore, it is not necessary to detect the pressure of the liquid on the downstream using a sensor or the like and it is not necessary to control the pressurizing unit 5 based on the detected pressure of the liquid on the downstream.

The first valve mechanism 6 of the present embodiment includes the first opening/closing mechanism 100, a first variable-volume mechanism 110, a first elastic body 120, and a first support member 121.

The first opening/closing mechanism 100 is for opening/closing an opening to the outside of the first atmosphere communication path 61C provided in the first main body portion 62 and is a valve that may be opened or closed by a control signal. The first opening/closing mechanism 100 of the present embodiment is formed of, for example, an electromagnetic valve.

By opening the first opening/closing mechanism 100, the first atmosphere communication path 61C is opened and the first air chamber 61B is opened to the atmosphere. As described above, by opening the first opening/closing mechanism 100 to open the first air chamber 61B to the atmosphere, the reference pressure inside the first air chamber 61B becomes the atmospheric pressure.

By closing the first opening/closing mechanism 100, the first atmosphere communication path 61C is closed and the first air chamber 61B is sealed. As described above, by closing the first opening/closing mechanism 100 and sealing the first air chamber 61B, since the supplying and the discharging of the gas inside the first air chamber 61B is not performed even if the first pressure receiving body 63 moves, the first pressure receiving body 63 becomes difficult to move. In other words, even if the first pressure receiving body 63 moves in a direction away from the first wall portion 62*a*, which is the valve closing direction, since the gas is not discharged from the first atmosphere communication path 61C, the reference pressure inside the first air chamber 61B rises as the first pressure receiving body 63 moves away from the first wall portion 62*a*. Therefore, as the first pressure receiving body 63 moves in a direction away from the first wall portion 62*a*, which is the valve closing direction, the reference pressure inside the first air chamber 61B rises, and the pressure difference between the pressure inside the first communication liquid chamber 612 and the reference pressure inside the first air chamber 61B decreases. Therefore, with regard to the threshold pressure inside the first communication liquid chamber 612 necessary for closing the valve when the first opening/closing mechanism 100 is closed to seal the first air chamber 61B, a higher pressure than the threshold pressure inside the first communication liquid chamber 612, that is, a large pressurization by the pressurizing unit 5 is necessary when the first opening/closing mechanism 100 is opened to open the first air chamber 61B to the atmosphere.

In other words, the threshold pressure of the first communication liquid chamber 612 which performs the opening/closing of the valve of the first valve mechanism 6 may be changed by opening/closing the first opening/closing mechanism 100 which opens/closes the first air chamber 61B for atmosphere communication. In the present embodiment, in a state in which the first opening/closing mechanism 100 is open, that is, in a state in which the first air chamber 61B is open to the atmosphere, the threshold pressure in the first communication liquid chamber 612 necessary for closing the valve is referred to as a first threshold pressure P1. On the other hand, in a state in which the first opening/closing mechanism 100 is closed, that is, in a state in which the first air chamber 61B is closed, the threshold pressure inside the first communication liquid chamber 612 necessary for closing the valve is referred to as a third threshold pressure P3. As described above, the third threshold pressure P3 when the first air chamber 61B is sealed is higher than the first threshold pressure P1 when the first air chamber 61B is caused to communicate with the atmosphere. In other words, third threshold pressure P3>first threshold pressure P1. In the present embodiment, closing the valve at the first threshold pressure P1 in the first valve mechanism 6 is referred to as a normal mode. Closing the valve at the third threshold pressure P3 which is higher than the first threshold pressure P1 in the first valve mechanism 6 is referred to as a boost mode. In the boost mode, since the valve closes at the third threshold pressure P3 which is higher than the first threshold pressure P1 of the normal mode, the supply amount of the liquid to be supplied downstream from the inside of the first communication liquid chamber 612 increases.

Furthermore, the first valve mechanism 6 is provided with the first variable-volume mechanism 110.

The first variable-volume mechanism 110 includes a first buffer chamber 111 and a first movable wall 112.

The first buffer chamber 111 is provided inside a first cylinder 113. The first cylinder 113 is formed of a cylindrical member. The first buffer chamber 111 is coupled to the first air chamber 61B via a first coupling path 114.

The first movable wall 112 is disposed in the inner portion of the first cylinder 113 and forms a portion of the wall of the first buffer chamber 111. The first movable wall 112 is provided to be capable of moving inside the first cylinder 113. In other words, the first movable wall 112 functions as a plunger capable of changing the volume of the first buffer chamber 111.

A first seal member 115 formed of an O-ring is provided between the outer circumferential surface of the first movable wall 112 and the inner circumferential surface of the first cylinder 113. Due to providing the first seal member 115, it is possible to move the first movable wall 112 inside the first cylinder 113 in a state in which the space between the first movable wall 112 and the first cylinder 113 is sealed.

The first movable wall 112 is provided with a first movable wall shaft portion 116 and a first movable wall flange portion 117. One end of the first movable wall shaft portion 116 is fixed to a surface of the first movable wall 112 on the opposite side to the first buffer chamber 111. The other end of the first movable wall shaft portion 116 is provided to protrude to the outside from an opening of the first cylinder 113 on the opposite side to the first buffer chamber 111. A first movable wall flange portion 117 is provided on the other end of the first movable wall shaft portion 116 protruding from the first cylinder 113. It is possible to move the first movable wall 112 inside the first cylinder 113 via the first movable wall shaft portion 116 by operating the first movable wall flange portion 117.

In the first variable-volume mechanism 110, the total volume of the first air chamber 61B and the first buffer chamber 111 is reduced by causing the first movable wall 112 to move to reduce the volume of the first buffer chamber 111. By moving the first movable wall 112 to increase the volume of the first buffer chamber 111, the total volume of the first air chamber 61B and the first buffer chamber 111 increases. In other words, the first air chamber 61B is configured to be capable of changing the actual volume independently of the operation of the first pressure receiving body 63.

It is possible to change the third threshold pressure P3 in the boost mode in which the first opening/closing mechanism 100 is closed by changing the volume of the first buffer chamber 111 using the first movable wall 112.

In other words, as illustrated in FIG. 5, when the volume of the first buffer chamber 111 is increased to increase the total volume of the first air chamber 61B and the first buffer chamber 111, the ratio of the pressure fluctuation inside the first air chamber 61B to the movement of the first pressure receiving body 63 decreases. Therefore, when the volume of the first buffer chamber 111 is increased, the first pressure receiving body 63 moves relatively easily and the third threshold pressure P3 for causing the valve to open/close in the boost mode in which the first opening/closing mechanism 100 is closed is relatively low.

On the other hand, as illustrated in FIG. 3, when the volume of the first buffer chamber 111 is reduced and the total volume of the first air chamber 61B and the first buffer chamber 111 is reduced, the ratio of the pressure fluctuation inside the first air chamber 61B to the movement of the first pressure receiving body 63 increases. Therefore, when the volume of the first buffer chamber 111 is reduced, the first pressure receiving body 63 is relatively difficult to move and the third threshold pressure P3 for causing the valve to open/close in the boost mode in which the first opening/closing mechanism 100 is closed is relatively high.

As described above, it is possible to adjust the third threshold pressure P3 in the boost mode due to the first variable-volume mechanism 110 of the present embodiment changing the volume of the first buffer chamber 111, which communicates with the first air chamber 61B, using the first movable wall 112. In other words, it is possible to vary the third threshold pressure P3 in the boost mode by increasing or decreasing the volume of the first buffer chamber 111 communicating with the first air chamber 61B. Therefore, in the boost mode, it is possible to render the flow rate of the liquid supplied to the liquid ejecting head 1 downstream of the first valve mechanism 6 variable.

The movement of the first movable wall 112 for increasing or decreasing the volume of the first buffer chamber 111 is performed by a first variable-volume mechanism drive unit (not illustrated). For the first variable-volume mechanism drive unit, for example, it is possible to use a combination of the power of an electric motor, an electromagnet, hydraulic pressure, or pneumatic power and gears for transmitting the power.

In the present embodiment, although the third threshold pressure P3 in the boost mode is rendered variable by providing the first variable-volume mechanism 110, only the first opening/closing mechanism 100 may be provided without providing the first variable-volume mechanism 110, for example. Even if only the first opening/closing mechanism 100 is provided in this manner, it is possible to execute the normal mode in which the opening/closing of the valve is performed at the first threshold pressure P1 and the boost mode in which the opening/closing of the valve is performed at the third threshold pressure P3.

The first valve mechanism 6 of the present embodiment is provided with the first elastic body 120 and the first support member 121.

The first elastic body 120 and the first support member 121 are provided inside a first through hole 62c provided in the first main body portion 62.

The first through hole 62c causes the first air chamber 61B and the outside to communicate with each other. One end of the first through hole 62c is opened in a surface facing the first spring receiving portion 633 inside a first air chamber 62B and is provided along the movement direction of the first pressure receiving body 63.

A first protruding portion 633b protruding from the first spring receiving portion 633 is inserted into the first through hole 62c on the first air chamber 62B side. The first support member 121 is held outside the first through hole 62c on the opening side. In the present embodiment, a male screw portion 121a is formed on the outer circumferential surface of the first support member 121. A female screw portion 62d into which the male screw portion 121a of the first support member 121 is screwed is formed on the inner circumferential surface of the first through hole 62c. Although not particularly illustrated, a sealing material such as a sealing tape is provided between the male screw portion 121a of the first support member 121 and the female screw portion 62d of the first through hole 62c and the gas inside the first air chamber 61B is prevented from leaking out from between the first support member 121 and the first through hole 62c. In other words, in the present embodiment, since the first opening/closing mechanism 100 is provided in the first valve mechanism 6, when the first opening/closing mechanism 100 is closed, the sealing material is necessary between the first support member 121 and the first through hole 62c in order to prevent the gas inside the first air chamber 61B from leaking out from between the first support member 121 and the first through hole 62c. However, for example, when the first air chamber 61B is always open to the atmosphere without providing the first opening/closing mechanism 100 in the first valve mechanism 6, the first air chamber 61B may be open to the atmosphere via the space between the first support member 121 and the first through hole 62c without providing the sealing material between the first support member 121 and the first through hole 62c.

It is possible to change the amount of insertion of the first support member 121 into the first through hole 62c according to the amount the first support member 121 is screwed into the first through hole 62c. Accordingly, it is possible to move the position of the leading end of the first support member 121 inside the first through hole 62c.

The first elastic body 120 is provided between the leading end surface of the first support member 121 and the first protruding portion 633b. In other words, one end of the first elastic body 120 is supported by the leading end of the first support member 121 and the other abuts against the first protruding portion 633b. In the present embodiment, the first elastic body 120 is formed of a compression coil spring. Therefore, the first elastic body 120 generates a biasing force which biases the first pressure receiving body 63 in a direction in which the valve opens.

Although the first elastic body 120 is not limited to a compression coil spring, the first elastic body 120 may be an elastically deformable material such as a rubber or an elastomer.

Due to the first support member 121 which supports the first elastic body 120 being capable of moving inside the first through hole 62c, it is possible to adjust the displacement amount of the first elastic body 120, that is, the biasing force by which the first elastic body 120 biases the first pressure receiving body 63 in the valve opening direction according to the position of the first support member 121 inside the first through hole 62c.

In other words, as illustrated in FIG. 6, due to the first support member 121 moving the leading end thereof to a position close to the first pressure receiving body 63 inside the first through hole 62c (hereinafter, referred to as progressing), the distance between the first support member 121 and the first pressure receiving body 63 becomes shorter and the biasing force by which the first elastic body 120 biases the first pressure receiving body 63 in the valve opening direction increases.

On the other hand, as illustrated in FIG. 3, due to the first support member 121 moving the leading end thereof to a position away from the first pressure receiving body 63 inside the first through hole 62c (hereinafter, referred to as withdrawing), the distance between the first support member 121 and the first pressure receiving body 63 becomes further and the biasing force by which the first elastic body 120 biases the first pressure receiving body 63 in the valve opening direction decreases. Incidentally, when the first elastic body 120 withdraws the first support member 121 to a position at which the first elastic body 120 does abut against the first pressure receiving body 63, the biasing force by which the first elastic body 120 biases the first pressure receiving body 63 in the valve opening direction becomes 0 (zero).

As illustrated in FIG. 6, when the biasing force by which the first elastic body 120 biases the first pressure receiving body 63 is large, since the biasing force acting in the direction in which the first pressure receiving body 63 opens the valve increases, the threshold pressure inside the first communication liquid chamber 612 necessary for the first pressure receiving body 63 to close the valve increases.

On the other hand, as illustrated in FIG. 3, when the biasing force by which the first elastic body 120 biases the first pressure receiving body 63 is small or 0 (zero), since the biasing force acting in the direction in which the first pressure receiving body 63 opens the valve decreases or becomes 0 (zero), the threshold pressure inside the first communication liquid chamber 612 necessary for the first pressure receiving body 63 to close the valve decreases as compared to the case of FIG. 6.

In other words, the threshold pressure of the first communication liquid chamber 612 that determines the opening/closing of the valve including the first valve body 65 and the first valve seat 66 is variable due to the first elastic body 120 and the first support member 121. In the present embodiment, the first support member 121 withdraws inside the first through hole 62c to a position away from the first pressure receiving body 63, and when the first elastic body 120 does not bias the first pressure receiving body 63, the threshold pressure inside the first communication liquid chamber 612 necessary to close the valve is referred to as a first threshold pressure P1'. On the other hand, when the first support member 121 progresses inside the first through hole 62c to a position close to the first pressure receiving body 63 and the first elastic body 120 biases the first pressure receiving body 63, the threshold pressure inside the first communication liquid chamber 612 necessary to close the valve is referred to as a fourth threshold pressure P4. As described above, the fourth threshold pressure P4 when the first pressure receiving body 63 is biased in the valve opening direction by the first elastic body 120 is higher than the first threshold pressure P1' when the first pressure receiving body 63 is not biased in the valve opening direction by the first elastic body 120. In other words, fourth threshold pressure P4>the first threshold pressure P1'.

In the present embodiment, opening the valve at the first threshold pressure P1' in the first valve mechanism 6 is referred to as the normal mode. Opening the valve at the fourth threshold pressure P4 which is higher than the first threshold pressure P1' in the first valve mechanism 6 is referred to as the boost mode.

The first threshold pressure P1' in which the first elastic body 120 and the first support member 121 cause the first valve mechanism 6 to operate in the normal mode is a state in which the first elastic body 120 does not bias the first pressure receiving body 63. Therefore, when the first elastic body 120 does not bias the first pressure receiving body 63, the first threshold pressure P1' is the same pressure as the first threshold pressure P1 when the first atmosphere communication path 61C is opened, the first air chamber 61B is opened to the atmosphere, and the first valve mechanism 6 is caused to operate in the normal mode. However, as compared to the boost mode, when the first elastic body 120 biases the first pressure receiving body 63 in the valve opening direction with a relatively small biasing force in the normal mode, the first threshold pressure P1' is a higher pressure than the first threshold pressure P1 in the normal mode in which the first air chamber 61B is opened to the atmosphere.

In the present embodiment, it is possible to change the displacement amount of the first elastic body 120, that is, the biasing force by which the first pressure receiving body 63 is biased in the direction of opening the valve according to the position of the leading end of the first support member 121 inside the first through hole 62c. Therefore, it is possible vary the threshold pressure inside the first communication liquid chamber 612 for closing the valve between the first threshold pressure P1' and the fourth threshold pressure P4' at the leading end position of the first support member 121 inside the first through hole 62c. Therefore, it is possible to vary the flow rate of the liquid supplied downstream from the first valve mechanism 6 to the liquid ejecting head 1.

The progression and withdrawal of the first support member 121 inside the first through hole 62c is performed by a first support member drive unit (not illustrated). For the first support member drive unit, for example, it is possible to use a combination of the power of an electric motor, an electromagnet, hydraulic pressure, or pneumatic power and gears for transmitting the power.

In this manner, by providing the first elastic body 120 and the first support member 121, it is possible to easily adjust the threshold pressure of the first communication liquid chamber 612 necessary for closing the valve without replacing the first pressure receiving body spring 64. Incidentally, since the first pressure receiving body spring 64 and the first valve body spring 67 are built into the inner portion of the first valve mechanism 6, it is difficult to provide a plurality of springs having different spring constants as the first pressure receiving body spring 64 and the first valve body spring 67 and exchange the first pressure receiving body spring 64 and the first valve body spring 67 in accordance with the threshold pressure of the first communication liquid chamber 612 necessary for closing the valve. In the present embodiment, since it is possible to adjust the deformation amount of the first elastic body 120 using the first support member 121 provided on the first air chamber 61B side which is accessible from the outside to adjust the biasing force by which the first pressure receiving body 63 is biased in the valve opening direction, it is not necessary to exchange the first pressure receiving body spring 64 and the first valve body spring 67. Since it is possible to adjust the deformation amount of the first elastic body 120 using the first support member 121 which is accessible from the outside, it is not necessary to prepare a plurality of the first pressure receiving body springs 64 and a plurality of first valve body springs 67 having different spring constants.

In this manner, in the present embodiment, the first valve mechanism 6 is provided with the first opening/closing mechanism 100, the first elastic body 120, and the first support member 121. Accordingly, it is possible to cause the first valve mechanism 6 to operate in the normal mode of the first threshold pressure P1 and the boost mode of the third threshold pressure P3 according to the first opening/closing mechanism 100, or alternatively, the normal mode of the first threshold pressure P1' and the boost mode of the fourth threshold pressure P4 according to the first elastic body 120 and the first support member 121. Naturally, by causing the first opening/closing mechanism 100, the first variable-volume mechanism 110, the first elastic body 120, and the first support member 121 to operate in combination, it is possible to cause the valve to operate at various threshold pressures.

In the present embodiment, although the first valve mechanism 6 includes the first opening/closing mechanism 100, the first variable-volume mechanism 110, the first elastic body 120, and the first support member 121, the configuration is not particularly limited thereto. For example, the first valve mechanism 6 may be configured to be provided with only the first opening/closing mechanism 100 without being provided with the first variable-volume mechanism 110, the first elastic body 120, and the first support member 121. In this manner, even when the first valve mechanism 6 is only provided with the first opening/closing mechanism 100, it is possible to execute the normal mode in which the valve is opened/closed at the first threshold pressure P1 and the boost mode in which the valve is opened/closed at the third threshold pressure P3 which is higher than the first threshold pressure P1.

The first valve mechanism 6 may be provided with the first opening/closing mechanism 100 and the first variable-volume mechanism 110 without providing the first elastic body 120 and the first support member 121. In this manner, by providing the first valve mechanism 6 with only the first opening/closing mechanism 100 and the first variable-volume mechanism 110, it is possible to execute the normal mode in which the valve is opened/closed at the first threshold pressure P1 and the boost mode in which the valve is opened/closed at the third threshold pressure P3 which is higher than the first threshold pressure P1 and it is possible to vary the third threshold pressure P3 of the boost mode.

Furthermore, the first valve mechanism 6 may be provided with only the first elastic body 120 and the first support member 121 without providing the first opening/closing mechanism 100 and the first variable-volume mechanism 110. In this manner, by providing the first valve mechanism 6 with only the first elastic body 120 and the first support member 121, it is possible to execute the normal mode in which the valve is opened/closed at the first threshold pressure P1 and the boost mode in which the valve is opened/closed at the fourth threshold pressure P4 which is higher than the first threshold pressure P1 and it is possible to vary the threshold pressures.

Figure 7:
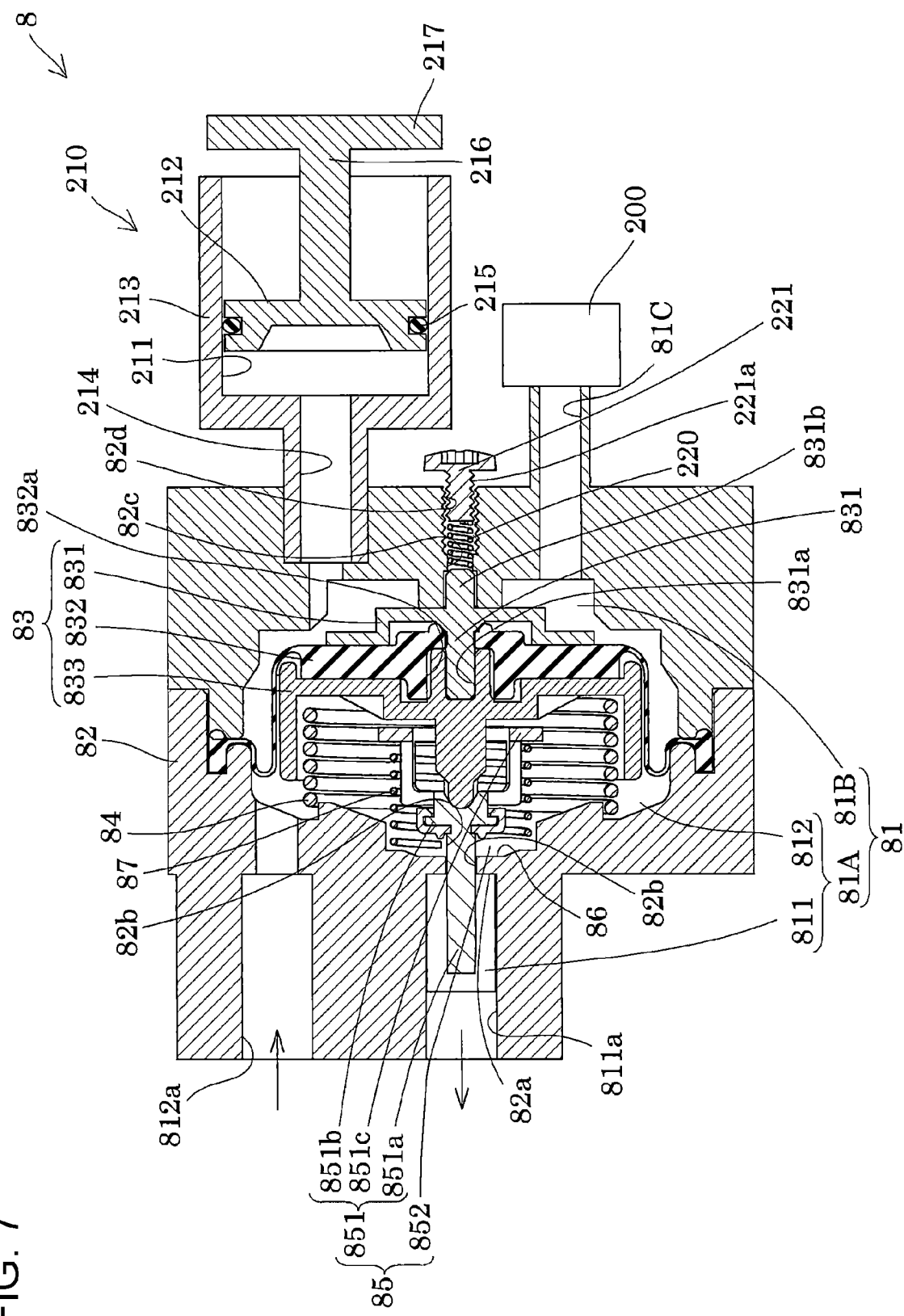
FIG. 7 is a sectional diagram of a second valve mechanism.
Figure 8:
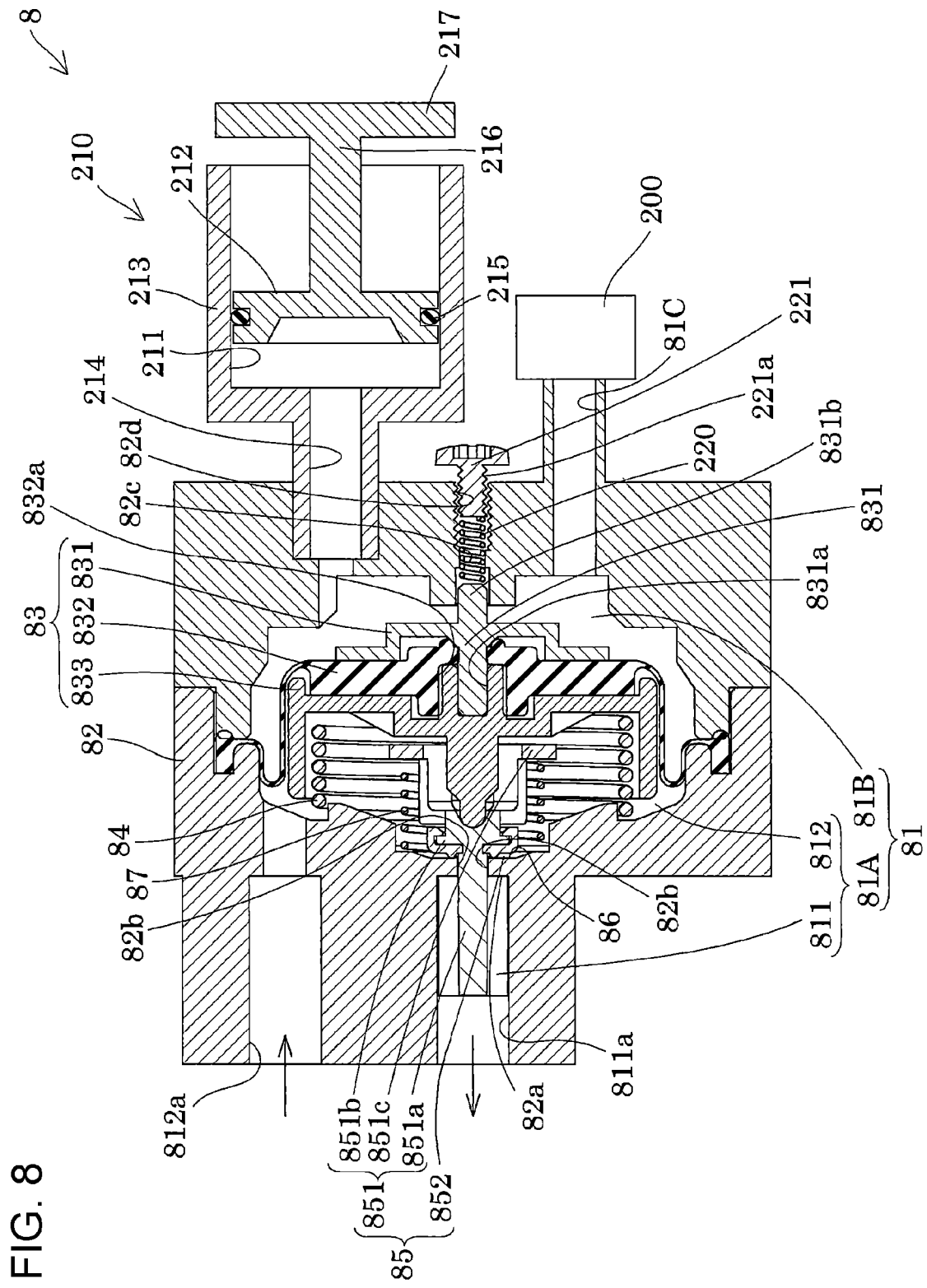
FIG. 8 is a sectional diagram of the second valve mechanism.
Figure 9:
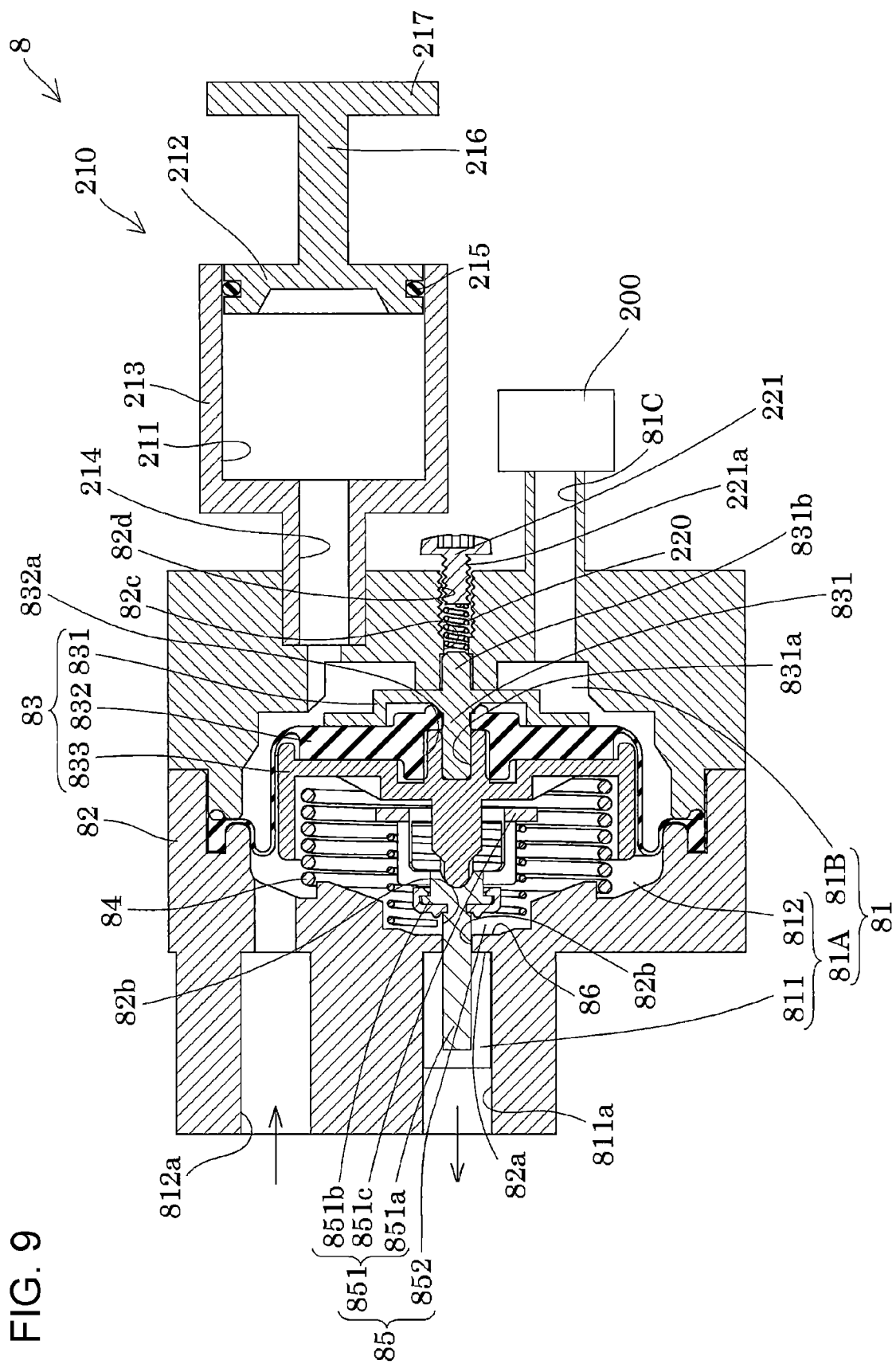
FIG. 9 is a sectional diagram illustrating operations of a second variable-volume mechanism.
Figure 10:
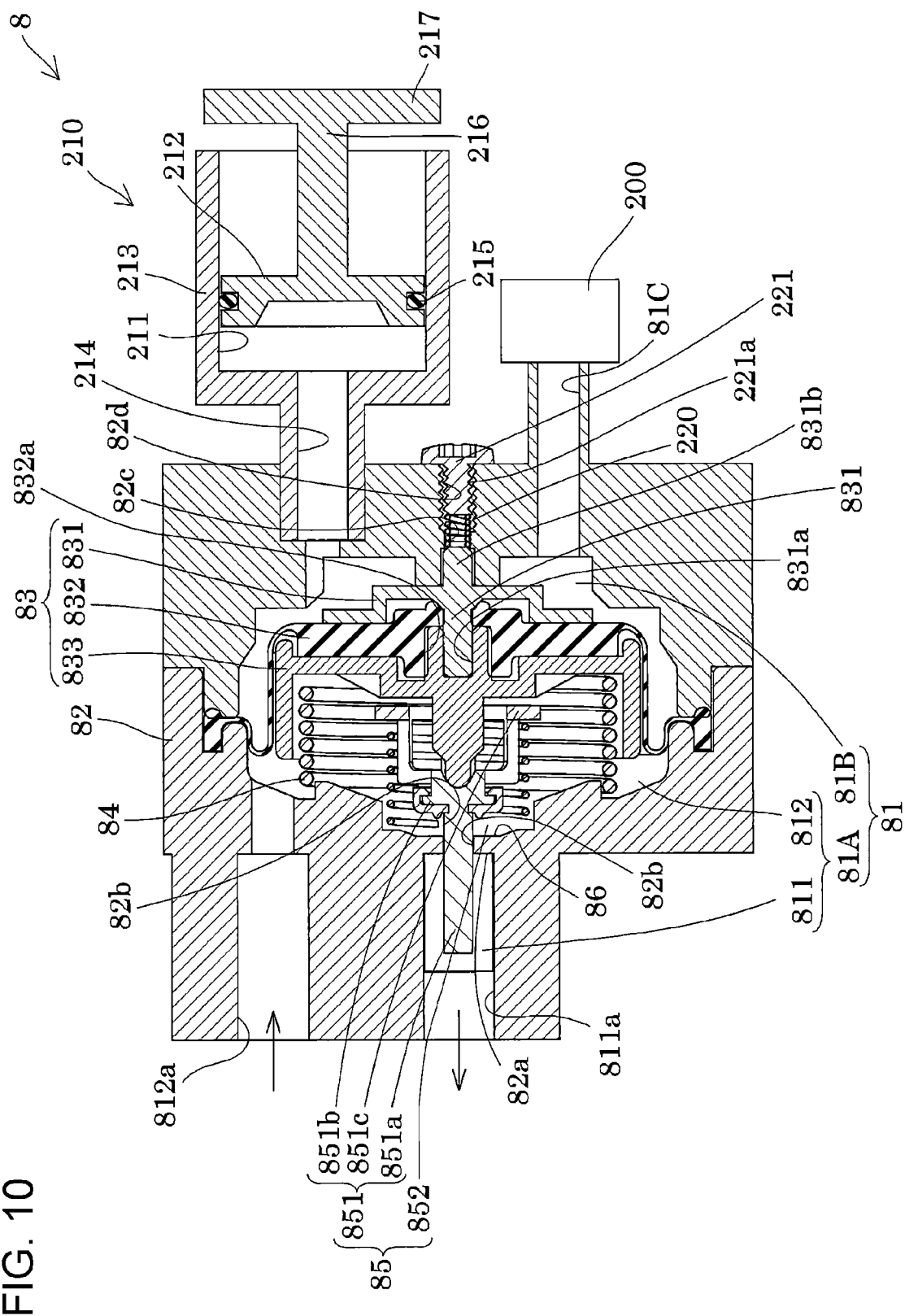
FIG. 10 is a sectional diagram illustrating operations of a second elastic body and a second support member.

Here, the second valve mechanism 8 will be further described with reference to FIGS. 7 to 10. FIG. 7 is a sectional diagram of the second valve mechanism in a valve closed state according to the first embodiment of the present disclosure. FIG. 8 is a sectional diagram of the second valve mechanism in a valve open state. FIG. 9 is a sectional diagram describing the operations of the second variable-volume mechanism. FIG. 10 is a sectional diagram describing the operations of the second elastic body and the second support member.

As illustrated in FIGS. 7 and 8, the second valve mechanism 8 includes a second main body portion 82 including a second storage chamber 81. The second main body portion 82 is formed by laminating a plurality of members, in the present embodiment, two members. It is possible to form the second main body portion 82 at low cost by molding using a resin material. Naturally, the material forming the second main body portion 82 is not limited thereto, and the second main body portion 82 may be formed of a metal material. The number of members which configure the second main body portion 82 is not limited to two. For example, the second main body portion 82 may be formed of one member or may be formed of two or more members.

A second pressure receiving body 83 is provided in the second storage chamber 81 and the second storage chamber 81 is partitioned into two rooms by the second pressure receiving body 83. One of the chambers of the second storage chamber 81 partitioned by the second pressure receiving body 83 is a second liquid chamber 81A filled with the liquid and the other chamber is a second air chamber 81B not filled with the liquid. The volumes of the second liquid chamber 81A and the second air chamber 81B both change in accordance with the operation of the second pressure receiving body 83.

The second pressure receiving body 83 includes a second pressure receiving portion 831, a second flexible portion 832, and a second spring receiving portion 833.

The second pressure receiving body 83 is formed by interposing a center portion of the second flexible portion 832 between the second pressure receiving portion 831 and the second spring receiving portion 833 from both sides.

The second pressure receiving portion 831 is provided in the second air chamber 81B. The second spring receiving portion 833 is provided inside the second liquid chamber 81A. The second liquid chamber 81A and the second air chamber 81B are partitioned by the second flexible portion 832.

The second flexible portion 832 is formed of a plate-shaped elastic material formed of a rubber or an elastomer, or a film-shaped resin material. The second flexible portion 832 of the present embodiment is made of rubber. A second through hole 832a penetrating the second flexible portion 832 in the thickness direction is provided in the center portion of the second flexible portion 832. The second pressure receiving portion 831 and the second spring receiving portion 833 are fixed to each other via the second through hole 832a. Specifically, the second pressure receiving portion 831 is provided with a second fixing pin 831a inserted into the second through hole 832a. The second spring receiving portion 833 is provided with a second fixing hole 833a into which the second fixing pin 831a is inserted and fixed. The second fixing pin 831a provided on the second pressure receiving portion 831 is inserted into the second through hole 832a from the second air chamber 81B side and a leading end of the second fixing pin 831a is inserted into the second fixing hole 833a from the second liquid chamber 81A side to fix the second pressure receiving portion 831 and the second spring receiving portion 833 to each other in a state in which the second flexible portion 832 is interposed therebetween. Since the second fixing pin 831a has an outer diameter slightly larger than the inner diameter of the second through hole 832a, the second fixing pin 831a and the second through hole 832a closely adhere to each other and leaking of the liquid inside the second liquid chamber 81A into the second air chamber 81B via the second through hole 832a is suppressed.

The end portion of the second flexible portion 832 is fixed to the inner wall surface of the second storage chamber 81 of the second main body portion 82 over the circumferential direction. In the present embodiment, the end portion of the second flexible portion 832 is fixed by being interposed between two stacked members which configure the second main body portion 82. The second flexible portion 832 in the present embodiment is a so-called bellowphragm and is a film in which the space between the end portion fixed to the second main body portion 82 and the portion interposed between and the second pressure receiving portion 831 and the second spring receiving portion 833 has a structure which is folded back in the direction in which the second liquid chamber 81A and the second air chamber 81B are lined up inside the second storage chamber 81. By providing the second flexible portion 832 folded back in this manner, the second flexible portion 832 may be easily deformed with a small force. In other words, it is possible to move the second pressure receiving portion 831 and the second spring receiving portion 833 in the direction in which the second liquid chamber 81A and the second air chamber 81B are lined up with a relatively small force by rolling the second flexible portion 832 so that the folded-back portion returns to the original orientation. Incidentally, for example, when the second flexible portion 832 is provided without being folded back, it is necessary to deform the second flexible portion 832 to extend the second flexible portion 832 in order to move the second pressure receiving portion 831 and the second spring receiving portion 833, and a relatively large force is necessary as compared to the case in which the second flexible portion 832 is folded back.

By deforming the second flexible portion 832, the second pressure receiving body 83 is capable of moving the second pressure receiving portion 831 and the second spring receiving portion 833 in a direction which partitions the second liquid chamber 81A and the second air chamber 81B from each other.

The second air chamber 81B communicates with the atmosphere via a second atmosphere communication path 81C provided in the second main body portion 82. In other words, one end of the second atmosphere communication path 81C is opened to the second air chamber 81B and the other end is opened to the outside of the second main body portion 82. As will be described in detail later, a second opening/closing mechanism 200 that opens/closes the second atmosphere communication path 81C is provided at an opening of the second atmosphere communication path 81C to the outside of the second main body portion 82. In this manner, it is possible to open or seal the second air chamber 81B with respect to the atmosphere by providing the second opening/closing mechanism 200 in the second atmosphere communication path 81C and opening/closing the second atmosphere communication path 81C using the second opening/closing mechanism 200.

A second pressure receiving body spring 84 is provided inside the second liquid chamber 81A between the second spring receiving portion 833 and the second main body portion 82. The second pressure receiving body spring 84 is a biasing member which biases the second pressure receiving body 83 toward the second air chamber 81B. The second pressure receiving body spring 84 of the present embodiment is formed of a compression coil spring. One end of the second pressure receiving body spring 84 abuts against the second spring receiving portion 833 and the other end of the second pressure receiving body spring 84 abuts against the inner wall surface of the second liquid chamber 81A of the second main body portion 82. Accordingly, the second pressure receiving body spring 84 biases the second pressure receiving body 83 in a direction which increases the volume of the second liquid chamber 81A. In other words, the second pressure receiving body 83 is biased by the second pressure receiving body spring 84 to deform the second flexible portion 832 and move the second flexible portion 832 in a direction which increase the volume of the second liquid chamber 81A. The biasing member which biases the second pressure receiving body 83 is not limited to the second pressure receiving body spring 84 formed of a compression coil spring and may be another spring such as a plate spring and may be an elastic body such as a rubber or an elastomer.

The second liquid chamber 81A includes a second supply chamber 811 and a second communication liquid chamber 812.

A second outflow port 811a coupled to the recovery flow path 4 is opened in the second supply chamber 811. The liquid inside the second supply chamber 811 is discharged from the second outflow port 811a due to the pressure being reduced by the depressurizing unit 7.

A portion of the wall of the second communication liquid chamber 812 is formed by the second pressure receiving body 83. The second communication liquid chamber 812 and the second supply chamber 811 are partitioned by a second wall portion 82a of the second main body portion 82.

A second inflow port 812a coupled to the recovery flow path 4 is opened in the second communication liquid chamber 812. The liquid discharged from the liquid ejecting head 1 is supplied into the second communication liquid chamber 812 via the second inflow port 812a.

The second supply chamber 811 is provided with a valve including a second valve body 85 and a second valve seat 86. Specifically, the second wall portion 82a that partitions the second communication liquid chamber 812 and the second supply chamber 811 from each other is provided with a second communication port 82b which causes the second communication liquid chamber 812 and the second supply chamber 811 to communicate with each other. The liquid of the second communication liquid chamber 812 flows out to the second supply chamber 811 via the second communication port 82b. The surface on the second communication liquid chamber 812 side of the second wall portion 82a in which the second communication port 82b is opened serves as the second valve seat 86. In other words, the second valve seat 86 includes the second communication port 82b as a hole serving as a liquid flow path. Although not particularly illustrated, the second valve seat 86 is provided with a liquid-repellent film having a property of repelling liquid, that is, a liquid-repellent property. The liquid-repellent film may be a film directly formed on the second valve seat 86 or a member on which a liquid-repellent film is provided may be fixed to the second main body portion 82, and the member provided with the liquid-repellent film may be used as the second valve seat 86. By providing the liquid-repellent film on the second valve seat 86 in this manner, the second valve body 85 repeatedly comes into contact with the second valve seat 86, and thereby, it is possible to suppress the accumulation of components contained in the liquid. Accordingly, it is possible to suppress the occurrence of poor adherence between the second valve seat 86 and the second valve body 85 caused by the accumulation of the components of the liquid and to suppress the leakage of the liquid in the valve closed state.

The second valve body 85 includes a second fixing member 851 and a second elastic member 852.

The second fixing member 851 is formed of a metal or a resin having a high rigidity, that is, a high Young's modulus as compared to the second elastic member 852.

The second fixing member 851 includes a second shaft portion 851a, a second flange portion 851b, and a valve body spring receiving portion 851c.

The second shaft portion 851a is formed of a columnar member having an outer diameter smaller than the inner diameter of the second communication port 82b. The second shaft portion 851a is capable of moving relative to the second wall portion 82a in the axial direction of the second shaft portion 851a in a state in which the second shaft portion 851a is inserted into the second communication port 82b.

One end of the second shaft portion 851a is positioned inside the second supply chamber 811.

The other end of the second shaft portion 851a is positioned inside the second communication liquid chamber 812. The second flange portion 851b is formed integrally with the other end of the second shaft portion 851a inside the second communication liquid chamber 812.

The second flange portion 851b abuts against the center portion of the second spring receiving portion 833 of the second pressure receiving body 83.

The second flange portion 851b is formed of a disk-shaped member having an outer diameter larger than the inner diameter of the second communication port 82b.

A valve body spring receiving portion 851c extends from the second flange portion 851b toward the second pressure receiving body 83.

A second valve body spring 87 which is a biasing member is provided between the valve body spring receiving portion 851c and the second main body portion 82. The second valve body spring 87 of the present embodiment is formed of a compression coil spring. The second valve body 85 is biased toward the second air chamber 81B by the second valve body spring 87 using the axial direction of the second shaft portion 851a as the movement direction. By providing the second valve body spring 87 in this manner, when the second pressure receiving body 83 does not press the second valve body 85 in the valve closing direction, it is possible to use the second valve body spring 87 to bias the second valve body 85 in the valve opening direction and close the valve. The biasing member which biases the second valve body 85 is not limited to the second valve body spring 87 formed of a compression coil spring and may be another spring such as a plate spring and may be an elastic body such as a rubber or an elastomer.

The second elastic member 852 is formed of a rubber or an elastomer having a lower Young's modulus than the second fixing member 851.

The second elastic member 852 is provided on a surface of the second flange portion 851b facing the second valve seat 86.

In the second valve mechanism 8, the forces acting on the second valve body 85 include the reaction force of the second flexible portion 832, the biasing force of the second pressure receiving body spring 84, the force acting on the second pressure receiving body 83 due to a pressure difference between the pressure inside the second communication liquid chamber 812 and the reference pressure inside the second air chamber 81B, and the biasing force of the second valve body spring 87.

Although the reaction force of the second flexible portion 832 is a force for the deformed second flexible portion 832 to return to the original shape, the reaction force is very small due to using the bellowphragm as the second flexible portion 832.

The force acting on the second pressure receiving body 83 due to the pressure difference between the pressure inside the second communication liquid chamber 812 and the reference pressure inside the second air chamber 81B is equal to the product of the pressure difference between the pressure inside the second communication liquid chamber 812 and the reference pressure inside the second air chamber 81B and the area of the second pressure receiving body 83. Here, the pressure inside the second communication liquid chamber 812 refers to the pressure of the liquid with which the second communication liquid chamber 812 is filled and is an absolute pressure. The reference pressure inside the second air chamber 81B refers to the pressure of the gas with which the second air chamber 81B is filled and is an absolute pressure. When the second air chamber 81B is open to the atmosphere through the first atmosphere communication path 61C, the reference pressure inside the second air chamber 81B becomes the atmospheric pressure.

When the pressure inside the second communication liquid chamber 812 becomes lower than the reference pressure inside the second air chamber 81B, a force caused by the pressure difference acts on the second pressure receiving body 83 in a direction which reduces the volume of the second communication liquid chamber 812. When the pressure inside the second communication liquid chamber 812 becomes higher than the reference pressure inside the second air chamber 81B, a force caused by the pressure difference acts on the second pressure receiving body 83 in a direction which increases the volume of the second communication liquid chamber 812.

The biasing force of the second pressure receiving body spring 84 is a force which biases the second valve body 85 in the valve opening direction via the second pressure receiving body 83. Therefore, the operating force of the second valve body 85 caused by the pressure difference between the pressure inside the second communication liquid chamber 812 and the reference pressure inside the second air chamber 81B is adjusted by the biasing force of the second pressure receiving body spring 84. For example, when the biasing force of the second pressure receiving body spring 84 is large, it is possible to move the second pressure receiving body 83 to close the valve in a case in which the pressure difference between the pressure inside the second communication liquid chamber 812 and the reference pressure inside the second air chamber 81B is relatively great.

The second valve body spring 87 is provided to bias the second valve body 85 against a protruding portion provided at the center of the second pressure receiving body 83. The second valve body 85 is configured separately from the second pressure receiving body 83, and thus, the movement of the second valve body 85 is coupled with that of the second pressure receiving body 83 and the second valve body 85 moves in a direction of opening the valve in accordance with the movement of the second pressure receiving body 83.

According to this configuration, the opening/closing of the valve is performed when the pressure difference between the pressure inside the second communication liquid chamber 812 and the reference pressure inside the second air chamber 81B reaches a predetermined value. In the present disclosure, the pressure of the liquid inside the second communication liquid chamber 812 when opening/closing of the valve is performed is referred to as a threshold pressure.

In the second valve mechanism 8, as illustrated in FIG. 7, a gap is formed between the second valve body 85 and the second valve seat 86 and the liquid inside the second supply chamber 811 and the second communication liquid chamber 812 is depressurized by the depressurizing unit 7 in a state in which the second communication port 82b is open, that is, the valve is open. Due to the pressure difference between the pressure of the liquid inside the second communication liquid chamber 812, which is decreased by the depressurizing of the liquid by the depressurizing unit 7, and the reference pressure inside the second air chamber 81B increasing, as illustrated in FIG. 8, the second pressure receiving body 83 is moved in a direction approaching the second wall portion 82a against the biasing force of the second pressure receiving body spring 84. The second valve body 85 is pressed against the second wall portion 82a against the biasing force of the second valve body spring 87 by the movement of the second pressure receiving body 83, the second valve body 85 and the second valve seat 86 abut against each other, and the valve closes. By closing the valve in this manner, the depressurizing of the liquid by the depressurizing unit 7 is performed only on the second supply chamber 811 and the depressurizing is not performed in the second communication liquid chamber 812. Therefore, the inside of the second communication liquid chamber 812 reaches a threshold pressure which is the pressure when the valve is closed. In the liquid ejecting system, the threshold pressure for opening/closing the valve of the second valve mechanism 8 provided in the recovery flow path 4 which is the downstream flow path is lower than the threshold pressure for opening/closing the valve of the first valve mechanism 6 provided in the supply flow path 3 which is the upstream flow path. Accordingly, it is possible to render the pressure of the liquid collected by the second valve mechanism 8 from the liquid ejecting head 1 lower than the pressure of the liquid supplied to the liquid ejecting head 1 by the first valve mechanism 6, and it is easy to render the pressure of the liquid inside the nozzles 11 of the liquid ejecting head 1 a negative pressure with respect to the atmospheric pressure.

Due to the liquid inside the second communication liquid chamber 812 being supplied from the liquid ejecting head 1 into the second communication liquid chamber 812 via the second inflow port 812a in a state in which the valve illustrated in FIG. 8 is closed, the pressure of the liquid inside the second communication liquid chamber 812 rises. As the pressure inside the second communication liquid chamber 812 increases, the pressure difference between the pressure inside the second communication liquid chamber 812 and the reference pressure between the second communication liquid chamber 812 and the second air chamber 81B becomes smaller than the biasing force of the second pressure receiving body spring 84, and thus, the second pressure receiving body 83 is caused to move away from the second wall portion 82a by the biasing force of the second pressure receiving body spring 84. As the second pressure receiving body 83 moves away from the second wall portion 82a, the second valve body 85 moves away from the second wall portion 82a due to the biasing force of the second valve body spring 87, and as illustrated in FIG. 7, a gap is formed between the second valve body 85 and the second valve seat 86, and the second communication port 82b opens, that is, the valve opens. In other words, when the pressure inside the second communication liquid chamber 812 reaches the threshold pressure, the valve closes, and when the pressure inside the second communication liquid chamber 812 rises above the threshold pressure, the valve opens. Therefore, since the inside of the second communication liquid chamber 812 is maintained at the threshold pressure, the second valve mechanism 8 recovers the liquid from the liquid ejecting head 1 at the threshold pressure.

As described above, due to the second valve mechanism 8 opening/closing the valve using the threshold pressure inside the second communication liquid chamber 812, it is possible to recover the liquid upstream at the threshold pressure inside the second communication liquid chamber 812. Therefore, it is not necessary to detect the pressure of the liquid on the upstream using a sensor or the like and it is not necessary to control the depressurizing unit 7 based on the detected pressure of the liquid on the upstream.

The second valve mechanism 8 of the present embodiment includes the second opening/closing mechanism 200, a second variable-volume mechanism 210, a second elastic body 220, and a second support member 221.

The second opening/closing mechanism 200 opens/closes an opening to the outside of the first atmosphere communication path 61C provided in the second main body portion 82 and is a valve that may be opened or closed by a control signal. The first opening/closing mechanism 100 of the present embodiment is formed of, for example, an electromagnetic valve.

By opening the second opening/closing mechanism 200, the second atmosphere communication path 81C is opened and the second air chamber 81B is opened to the atmosphere. As described above, by opening the second opening/ closing mechanism 200 to open the second air chamber 81B to the atmosphere, the reference pressure inside the second air chamber 81B becomes the atmospheric pressure.

By closing the second opening/closing mechanism 200, the second atmosphere communication path 81C is closed and the second air chamber 81B is sealed. As described above, by closing the second opening/closing mechanism 200 and sealing the second air chamber 81B, since the supplying and the discharging of the gas inside the second air chamber 81B is not performed even if the second pressure receiving body 83 moves, the second pressure receiving body 83 becomes difficult to move. In other words, even if the second pressure receiving body 83 moves toward the second wall portion 82a, which is the valve closing direction, since the gas is not refilled from the second atmosphere communication path 81C, the reference pressure inside the second air chamber 81B falls as the second pressure receiving body 83 moves toward the second wall portion 82a. Therefore, as the second pressure receiving body 83 moves toward the second wall portion 82a, which is the valve closing direction, the reference pressure inside the second air chamber 81B rises, and the pressure difference between the pressure inside the second communication liquid chamber 812 and the reference pressure inside the second air chamber 81B decreases. Therefore, with regard to the threshold pressure inside the second communication liquid chamber 812 necessary for closing the valve when the second opening/closing mechanism 200 is closed to seal the second air chamber 81B, a lower pressure than the threshold pressure inside the second communication liquid chamber 812, that is, a large depressurizing by the depressurizing unit 7 is necessary when the second opening/closing mechanism 200 is opened to open the second air chamber 81B to the atmosphere.

In other words, the threshold pressure of the second communication liquid chamber 812 which performs the opening/closing of the valve of the second valve mechanism 8 may be changed by opening/closing the second opening/closing mechanism 200 which opens/closes the second air chamber 81B for atmosphere communication. In the present embodiment, in a state in which the second opening/closing mechanism 200 is open, that is, in a state in which the second air chamber 81B is open to the atmosphere, the threshold pressure in the second communication liquid chamber 812 necessary for closing the valve is referred to as a second threshold pressure P2. On the other hand, in a state in which the second opening/closing mechanism 200 is closed, that is, in a state in which the second air chamber 81B is closed, the threshold pressure inside the second communication liquid chamber 812 necessary for closing the valve is referred to as a fifth threshold pressure P5. As described above, the fifth threshold pressure P5 when the second air chamber 81B is sealed is lower than the second threshold pressure P2 when the second air chamber 81B is caused to communicate with the atmosphere. In other words, fifth threshold pressure P5<second threshold pressure P2. In the present embodiment, closing the valve at the second threshold pressure P2 in the second valve mechanism 8 is referred to as a normal mode. Closing the valve at the fifth threshold pressure P5 which is lower than the second threshold pressure P2 in the second valve mechanism 8 is referred to as a boost mode. In the boost mode, since the valve closes at the fifth threshold pressure P5 which is lower than the second threshold pressure P2 of the normal mode, the supply amount of the liquid to be recovered from upstream by the second communication liquid chamber 812 increases.

Furthermore, the second valve mechanism 8 is provided with the second variable-volume mechanism 210.

The second variable-volume mechanism 210 includes a second buffer chamber 211 and a second movable wall 212.

The second buffer chamber 211 is provided inside a second cylinder 213. The second cylinder 213 is formed of a cylindrical member. The second buffer chamber 211 is coupled to the second air chamber 81B via a second coupling path 214.

The second movable wall 212 is disposed in the inner portion of the second cylinder 213 and forms a portion of the wall of the second buffer chamber 211. The second movable wall 212 is provided to be capable of moving inside the second cylinder 213. In other words, the second movable wall 212 functions as a plunger capable of changing the volume of the second buffer chamber 211.

A second seal member 215 formed of an O-ring is provided between the outer circumferential surface of the second movable wall 212 and the inner circumferential surface of the second cylinder 213. Due to providing the second seal member 215, it is possible to move the second movable wall 212 inside the second cylinder 213 in a state in which the space between the second movable wall 212 and the second cylinder 213 is sealed.

The second movable wall 212 is provided with a second movable wall shaft portion 216 and a second movable wall flange portion 217. One end of the second movable wall shaft portion 216 is fixed to a surface of the second movable wall 212 on the opposite side to the second buffer chamber 211. The other end of the second movable wall shaft portion 216 is provided to protrude to the outside from an opening of the second cylinder 213 on the opposite side to the second buffer chamber 211. A second movable wall flange portion 217 is provided on the other end of the second movable wall shaft portion 216 protruding from the second cylinder 213. It is possible to move the second movable wall 212 inside the second cylinder 213 via the second movable wall shaft portion 216 by operating the second movable wall flange portion 217.

In the second variable-volume mechanism 210, the total volume of the second air chamber 81B and the second buffer chamber 211 is reduced by causing the second movable wall 212 to move to reduce the volume of the second buffer chamber 211. By moving the second movable wall 212 to increase the volume of the second buffer chamber 211, the total volume of the second air chamber 81B and the second buffer chamber 211 increases. In other words, the second air chamber 81B is configured to be capable of changing the actual volume independently of the operation of the second pressure receiving body 83.

It is possible to change the fifth threshold pressure P5 in the boost mode in which the second opening/closing mechanism 200 is closed by changing the volume of the second buffer chamber 211 using the second movable wall 212.

In other words, as illustrated in FIG. 9, when the volume of the second buffer chamber 211 is increased to increase the total volume of the second air chamber 81B and the second buffer chamber 211, the ratio of the pressure fluctuation inside the second air chamber 81B to the movement of the second pressure receiving body 83 decreases. Therefore, when the volume of the second buffer chamber 211 is increased, the second pressure receiving body 83 moves relatively easily and the fifth threshold pressure P5 in the boost mode in which the second opening/closing mechanism 200 is closed is relatively high.

On the other hand, as illustrated in FIG. 7, when the volume of the second buffer chamber 211 is reduced and the total volume of the second air chamber 81B and the second buffer chamber 211 is reduced, the ratio of the pressure fluctuation inside the second air chamber 81B to the movement of the second pressure receiving body 83 increases. Therefore, when the volume of the second buffer chamber 211 is reduced, the second pressure receiving body 83 moves relatively less easily and the fifth threshold pressure P5 in the boost mode in which the second opening/closing mechanism 200 is closed is relatively low.

As described above, it is possible to adjust the fifth threshold pressure P5 in the boost mode due to the second variable-volume mechanism 210 of the present embodiment changing the volume of the second buffer chamber 211, which communicates with the second air chamber 81B, using the second movable wall 212. In other words, it is possible to vary the fifth threshold pressure P5 in the boost mode by increasing or decreasing the volume of the second buffer chamber 211 communicating with the second air chamber 81B. Therefore, in the boost mode, it is possible vary the flow rate of the liquid recovered from the liquid ejecting head 1 upstream of the second valve mechanism 8.

The movement of the second movable wall 212 for increasing or decreasing the volume of the second buffer chamber 211 is performed by a second variable-volume mechanism drive unit (not illustrated). For the second variable-volume mechanism drive unit, for example, it is possible to use a combination of the power of an electric motor, an electromagnet, hydraulic pressure, or pneumatic power and gears for transmitting the power.

In the present embodiment, although the fifth threshold pressure P5 in the boost mode is rendered variable by providing the second variable-volume mechanism 210, only the second opening/closing mechanism 200 may be provided without providing the second variable-volume mechanism 210, for example. Even if only the second opening/closing mechanism 200 is provided in this manner, it is possible to execute the normal mode in which the opening/closing of the valve is performed at the second threshold pressure P2 and the boost mode in which the opening/closing of the valve is performed at the fifth threshold pressure P5.

The second valve mechanism 8 of the present embodiment is provided with the second elastic body 220 and the second support member 221.

The second elastic body 220 and the second support member 221 are provided inside a second through hole 82c provided in the second main body portion 82.

The second through hole 82c causes a second air chamber 82B and the outside to communicate with each other. One end of the second through hole 82c is opened in a surface facing the second pressure receiving portion 831 inside the second air chamber 82B and is provided along the movement direction of the second pressure receiving body 83.

A second protruding portion 831b protruding from the second pressure receiving portion 831 is inserted into the second through hole 82c on the second air chamber 82B side. The second support member 221 is held outside the second through hole 82c on the opening side. In the present embodiment, a male screw portion 221a is formed on the outer circumferential surface of the second support member 221. A female screw portion 82d into which the male screw portion 221a of the second support member 221 is screwed is formed on the inner circumferential surface of the second through hole 82c. Although not particularly illustrated, a sealing material such as a sealing tape is provided between the male screw portion 221a of the second support member 221 and the female screw portion 82d of the second through hole 82c and the gas inside the second air chamber 81B is prevented from leaking out from between the second support member 221 and the second through hole 82c. In other words, in the present embodiment, since the second opening/closing mechanism 200 is provided in the second valve mechanism 8, when the second opening/closing mechanism 200 is closed, the sealing material is necessary between the second support member 221 and the second through hole 82c in order to prevent the gas inside the second air chamber 81B from leaking out from between the second support member 221 and the second through hole 82c. However, for example, when the second air chamber 81B is always open to the atmosphere without providing the second opening/closing mechanism 200 in the second valve mechanism 8, the second air chamber 81B may be open to the atmosphere via the space between the second support member 221 and the second through hole 82c without providing the sealing material between the second support member 221 and the second through hole 82c.

It is possible to change the amount of insertion of the second support member 221 into the second through hole 82c according to the amount the second support member 221 is screwed into the second through hole 82c. Accordingly, it is possible to move the position of the leading end of the second support member 221 inside the second through hole 82c.

The second elastic body 220 is provided between the leading end surface of the second support member 221 and the second protruding portion 831b. In other words, one end of the second elastic body 220 is supported by the leading end of the second support member 221 and the other abuts against the second protruding portion 831b. In the present embodiment, the second elastic body 220 is formed of a compression coil spring. Therefore, the second elastic body 220 generates a biasing force which biases the second pressure receiving body 83 in a direction in which the valve closes.

Although the second elastic body 220 is not limited to a compression coil spring, the second elastic body 220 may be an elastically deformable material such as a rubber or an elastomer.

Due to the second support member 221 which supports the second elastic body 220 being capable of moving inside the second through hole 82c, it is possible to adjust the displacement amount of the second elastic body 220, that is, the biasing force by which the second elastic body 220 biases the second pressure receiving body 83 according to the position of the second support member 221 inside the second through hole 82c.

In other words, due to the second support member 221 moving the leading end thereof to a position close to the second pressure receiving body 83 inside the second through hole 82c (hereinafter, referred to as progressing), the distance between the second support member 221 and the second pressure receiving body 83 becomes shorter and the biasing force by which the second elastic body 220 biases the second pressure receiving body 83 in the valve closing direction increases.

On the other hand, due to the second support member 221 moving the leading end thereof to a position away from the second pressure receiving body 83 inside the second through hole 82c (hereinafter, referred to as withdrawing), the distance between the second support member 221 and the second pressure receiving body 83 becomes further and the biasing force by which the second elastic body 220 biases the second pressure receiving body 83 in the valve closing direction decreases. Incidentally, when the second elastic body 220 withdraws the second support member 221 to a position at which the second elastic body 220 does abut against the second pressure receiving body 83, the biasing force by which the second elastic body 220 biases the second pressure receiving body 83 in the valve closing direction becomes 0 (zero).

Then, when the biasing force by which the second elastic body 220 biases the second pressure receiving body 83 is large, since the force acting in the direction in which the second pressure receiving body 83 closes the valve becomes large, the force acting, through a pressure difference, against the biasing force acting in the valve opening direction of the second pressure receiving body spring 84 may be smaller by an amount corresponding to the biasing force of the second elastic body 220. Therefore, the threshold pressure inside the second communication liquid chamber 812 necessary for the second pressure receiving body 83 to close the valve is relatively high.

On the other hand, when the biasing force by which the second elastic body 220 biases the second pressure receiving body 83 is small or 0 (zero), since the biasing force acting in the direction in which the second pressure receiving body 83 closes the valve decreases or becomes 0 (zero), the threshold pressure inside the second communication liquid chamber 812 necessary for the second pressure receiving body 83 to close the valve becomes relatively low.

In other words, the threshold pressure of the second communication liquid chamber 812 that determines the opening/closing of the valve including the second valve body 85 and the second valve seat 86 is variable due to by the second elastic body 220 and the second support member 221. In the present embodiment, when the second support member 221 proceeds to a position near the second pressure receiving body 83 inside the second through hole 82c and the second elastic body 220 biases the second pressure receiving body 83, the threshold pressure inside the second communication liquid chamber 812 necessary for closing the valve is referred to as a second threshold pressure P2'. On the other hand, when the second support member 221 withdraws to a position away from the second pressure receiving body 83 inside the second through hole 82c and the second elastic body 220 does not bias the second pressure receiving body 83, the threshold pressure inside the second communication liquid chamber 812 necessary to close the valve is referred to as a sixth threshold pressure P6. As described above, the sixth threshold pressure P6 when the second pressure receiving body 83 is not biased in the valve closing direction by the second elastic body 220 is lower than the second threshold pressure P2' when the second pressure receiving body 83 is biased in the valve closing direction by the second elastic body 220. In other words, sixth threshold pressure P6<second threshold pressure P2'.

In the present embodiment, closing the valve at the second threshold pressure P2' in the second valve mechanism 8 is referred to as a normal mode. Closing the valve at the sixth threshold pressure P6 which is lower than the second threshold pressure P2' in the second valve mechanism 8 is referred to as a boost mode.

The sixth threshold pressure P6 in which the second elastic body 220 and the second support member 221 cause the second valve mechanism 8 to operate in the boost mode is a state in which the second elastic body 220 does not bias the second pressure receiving body 83. Therefore, when the second elastic body 220 does not bias the second pressure receiving body 83, the sixth threshold pressure P6 is the same pressure as the second threshold pressure P2 when the second atmosphere communication path 81C is opened, the second air chamber 81B is opened to the atmosphere, and the second valve mechanism 8 is caused to operate in the normal mode. However, as compared to the boost mode, when the second elastic body 220 biases the second pressure receiving body 83 in the valve closing direction with a relatively small biasing force in the normal mode, the sixth threshold pressure P6 is a higher pressure than the second threshold pressure P2 in the normal mode in which the second air chamber 81B is opened to the atmosphere.

In the present embodiment, it is possible to change the displacement amount of the second elastic body 220, that is, the biasing force by which the second pressure receiving body 83 is biased in the valve closing direction according to the position of the leading end of the second support member 221 inside the second through hole 82c. Therefore, it is possible to vary the threshold pressure inside the second communication liquid chamber 812 capable of closing the valve between the second threshold pressure P2 and the sixth threshold pressure P6 at the leading end position of the second support member 221 inside the second through hole 82c. Therefore, it is possible to vary the flow rate of the liquid recovered from the liquid ejecting head 1 upstream of the second valve mechanism 8.

The progression and withdrawal of the second support member 221 inside the second through hole 82c is performed by a second support member drive unit (not illustrated). For the second support member drive unit, for example, it is possible to use a combination of the power of an electric motor, an electromagnet, hydraulic pressure, or pneumatic power and gears for transmitting the power.

In this manner, by providing the second elastic body 220 and the second support member 221, it is possible to easily adjust the threshold pressure of the second communication liquid chamber 812 necessary for closing the valve without replacing the second pressure receiving body spring 84. Incidentally, since the second pressure receiving body spring 84 and the second valve body spring 87 are built into the inner portion of the second valve mechanism 8, it is difficult to provide a plurality of springs having different spring constants as the second pressure receiving body spring 84 and the second valve body spring 87 and exchange the second pressure receiving body spring 84 and the second valve body spring 87 in accordance with the threshold pressure of the second communication liquid chamber 812 necessary for closing the valve. In the present embodiment, since it is possible to adjust the deformation amount of the second elastic body 220 using the second support member 221 provided on the second air chamber 81B side which is accessible from the outside to adjust the biasing force by which the second pressure receiving body 83 is biased in the valve closing direction, it is not necessary to exchange the second pressure receiving body spring 84 and the second valve body spring 87. Since it is possible to adjust the deformation amount of the second elastic body 220 using the second support member 221 which is accessible from the outside, it is not necessary to prepare a plurality of the second pressure receiving body springs 84 and a plurality of second valve body springs 87 having different spring constants.

In this manner, in the present embodiment, the second valve mechanism 8 is provided with the second opening/closing mechanism 200, the second elastic body 220, and the second support member 221. Accordingly, it is possible to cause the second valve mechanism 8 to operate in the normal mode of the second threshold pressure P2 and the boost mode of the fifth threshold pressure P5 according to the second opening/closing mechanism 200, or alternatively, the normal mode of the second threshold pressure P2' and the boost mode of the sixth threshold pressure P6 according to the second elastic body 220 and the second support member 221. Naturally, by causing the second opening/closing mechanism 200, the second variable-volume mechanism 210, the second elastic body 220, and the second support member 221 to operate in combination, it is possible to cause the valve to operate at various threshold pressures.

In the present embodiment, although the second valve mechanism 8 includes the second opening/closing mechanism 200, the second variable-volume mechanism 210, the second elastic body 220, and the second support member 221, the configuration is not particularly limited thereto. For example, by providing the second valve mechanism 8 with only the second opening/closing mechanism 200 without providing the second variable-volume mechanism 210, the second elastic body 220, and the second support member 221, it is possible to execute the normal mode in which the valve is opened/closed at the second threshold pressure P2 and the boost mode in which the valve is opened/closed at the fifth threshold pressure P5 which is lower than the second threshold pressure P2. It is possible to render to fifth threshold pressure P5 of the boost mode variable by providing the second valve mechanism 8 with the second opening/closing mechanism 200 and the second variable-volume mechanism 210 without providing the second elastic body 220 and the second support member 221. Furthermore, by providing the second valve mechanism 8 with only the second opening/closing mechanism 200 and the second variable-volume mechanism 210 without providing the second elastic body 220 and the second support member 221, it is possible to execute the normal mode in which the valve is opened/closed at the second threshold pressure P2' and the boost mode in which the valve is opened/closed at the sixth threshold pressure P6 which is lower than the second threshold pressure P2'.

Figure 11:
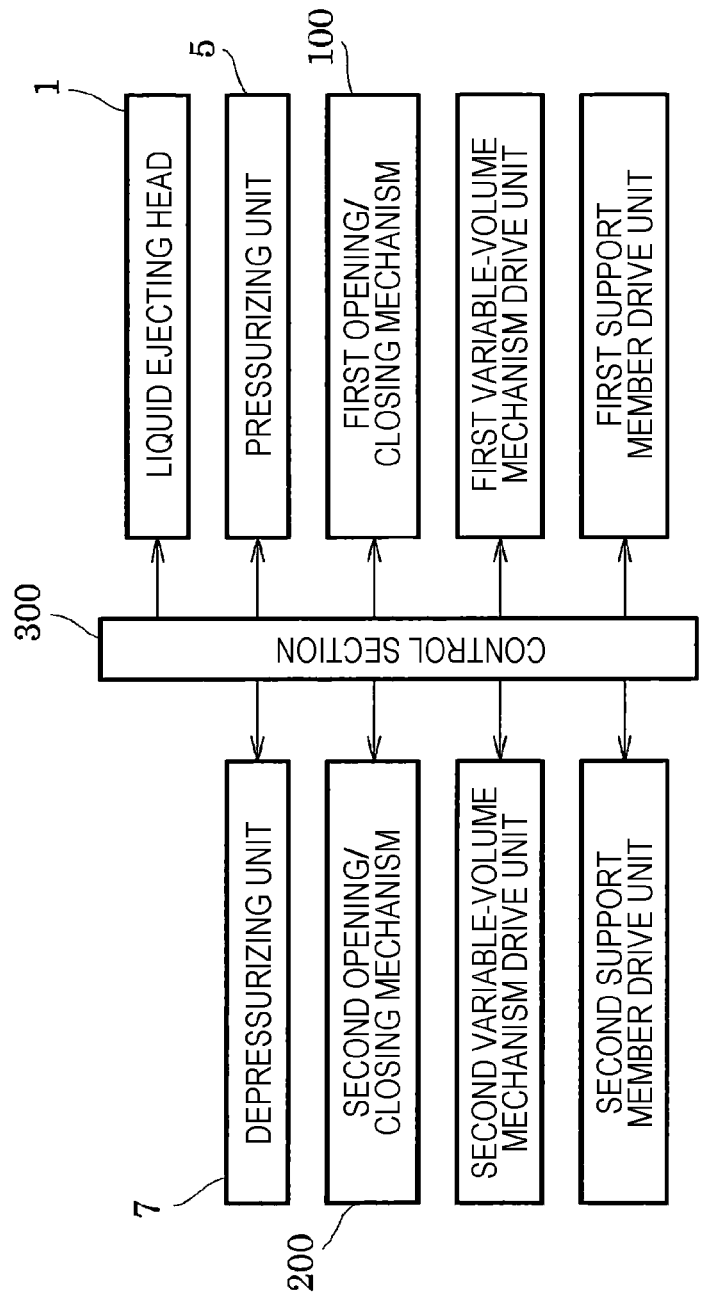
FIG. 11 is a block diagram illustrating an electrical configuration of the liquid ejecting system.

As illustrated in FIG. 11, the liquid ejecting system includes a control section 300 that controls the constituent elements which configure the liquid ejecting system.

The control section 300 controls the liquid ejecting head 1, the pressurizing unit 5, and the depressurizing unit 7. The control section 300 controls the liquid ejecting head 1 to eject liquid droplets from the nozzles 11, thereby causing the liquid ejecting head 1 to perform normal operations such as recording, rendering, or application. The control section 300 controls the pressurizing unit 5 and the depressurizing unit 7 to circulate the liquid between the liquid ejecting head 1 and the liquid storage portion 2.

The control section 300 controls the first opening/closing mechanism 100, the first variable-volume mechanism drive unit that drives the first variable-volume mechanism 110, and the first support member drive unit that drives the first support member 121. In this manner, the control section 300 controls the first opening/closing mechanism 100, the first variable-volume mechanism drive unit, and the first support member drive unit to switch between operation in the normal mode in which the threshold pressure inside the first communication liquid chamber 612 is the first threshold pressure P1 or P1' operation in the boost mode in which the threshold pressure inside the first communication liquid chamber 612 is the third threshold pressure P3 or the fourth threshold pressure P4.

Furthermore, the control section 300 controls the second opening/closing mechanism 200, the second variable-volume mechanism drive unit that drives the second variable-volume mechanism 210, and the second support member drive unit that drives the second support member 221. In this manner, the control section 300 controls the second opening/closing mechanism 200, the second variable-volume mechanism drive unit, and the second support member drive unit to switch between operation in the normal mode in which the threshold pressure inside the second communication liquid chamber 812 is the second threshold pressure P2 or P2' operation in the boost mode in which the threshold pressure inside the second communication liquid chamber 812 is the fifth threshold pressure P5 or the sixth threshold pressure P6.

The control section 300 is configured to include a processing device such as a central processing unit (CPU) or a field programmable gate array (FPGA) and a storage medium such as a semiconductor memory such as a read only memory (ROM) and random access memory (RAM). The control is performed by the processing device executing the program stored on the storage medium.

The control section 300 may be provided with a plurality of components that individually control the constituent elements, or may be provided with a component that comprehensively controls the constituent elements.

In the liquid ejecting system, the pressurizing force of the pressurizing unit 5 is adjusted to the threshold pressure inside the first communication liquid chamber 612 which opens/closes the valve of the first valve mechanism 6 and the liquid is supplied to the liquid ejecting head 1. The depressurizing force of the depressurizing unit 7 is adjusted to the threshold pressure inside the second communication liquid chamber 812 which opens/closes the valve of the second valve mechanism 8 and recovers the liquid from the liquid ejecting head 1. The threshold pressure inside the second communication liquid chamber 812 is smaller than the threshold pressure inside the first communication liquid chamber 612. Accordingly, the liquid circulates between the liquid ejecting head 1 and the liquid storage portion 2.

Here, it is possible to execute the normal mode and the boost mode of the first valve mechanism 6 and the normal mode and the boost mode of the second valve mechanism 8 in the following combinations.

TABLE 1

| | Normal Operation | First Maintenance Operation (Excessive Depressurizing Operation) | Second Maintenance Operation (Excessive Pressurizing Operation) | Third Maintenance Operation (High Speed Circulation Operation) |
| --- | --- | --- | --- | --- |
| First Valve Mechanism | normal mode (first normal mode) | normal mode (first normal mode) | boost mode (first boost mode) | boost mode (first boost mode) |
| Second Valve Mechanism | normal mode (second normal mode) | boost mode (second boost mode) | normal mode (second normal mode) | boost mode (second boost mode) |

In normal operation, the first valve mechanism 6 is caused to operate in the normal mode in which the valve is opened/closed at the first threshold pressure P1 or P1' and the second valve mechanism 8 is caused to operate in the normal mode in which the valve is opened/closed at the second threshold pressure P2 or P2'. The normal operation is an operation in which the liquid ejecting head 1 is used in the original use of the liquid ejecting head 1 such as recording, rendering, and application by the liquid ejecting head.

In the first maintenance operation, the first valve mechanism 6 is caused to operate in the normal mode in which the valve is opened/closed at the first threshold pressure P1 or P1' and the second valve mechanism 8 is caused to operate in the boost mode in which the valve is opened/closed at the fifth threshold pressure P5 or the sixth threshold pressure P6 which are lower than the threshold pressure in the normal mode. The first maintenance operation is used during a liquid filling operation, for example. Since the liquid supplied under pressure more easily leaks from the nozzle in a situation in which the downstream of the nozzle is not filled with the liquid, it is possible to ensure that such leaking occurs less easily by further reducing the pressure downstream of the nozzle. The maintenance operation is also suitable for causing the meniscus position of the liquid inside the nozzle to withdraw to the vicinity of the pressure chamber (refer to FIG. 2), more effectively recovering the increased-viscosity liquid inside the nozzle, and restoring the from-nozzle discharging ability.

In the second maintenance operation, the first valve mechanism 6 is caused to operate in the boost mode in which the valve is opened/closed at the third threshold pressure P3 or the fourth threshold pressure P4 which are higher than the threshold pressure of the normal mode and the second valve mechanism 8 is caused to operate in the normal mode in which the valve is opened/closed at the second threshold pressure P2 or P2'. The second maintenance operation is used as a so-called pressurized cleaning operation. In other words, the second maintenance operation is a maintenance operation suitable for forcibly removing the liquid or foreign matter adhered to the inside of the nozzle by rendering the liquid pressure at the nozzle position higher than the atmospheric pressure to cause the liquid to flow out of the nozzle.

In the third maintenance operation, the first valve mechanism 6 is caused to operate in the boost mode in which the valve is opened/closed at the third threshold pressure P3 or the fourth threshold pressure P4 which are higher than the threshold pressure in the normal mode and the second valve mechanism 8 is caused to operate in the boost mode in which the valve is opened/closed at the fifth threshold pressure P5 or the sixth threshold pressure P6 which are lower than the threshold pressure of the normal mode. The third maintenance operation is suitable for increasing the circulation flow rate to quickly collect bubbles and the like in the flow path.

For example, by performing the first maintenance operation or the second maintenance operation at the time of the cleaning operation of suctioning the liquid from the nozzle surface 11*a*, it is possible to efficiently perform the cleaning of the periphery of the nozzles 11 as compared to a case in which the cleaning is performed using the normal operation.

As described above, the first valve mechanism 6 which is the valve mechanism of the present embodiment is used for a flow path coupled to the liquid ejecting head 1 that ejects a liquid includes the first valve body 65 and the first valve seat 66 which are a valve which opens/closes the flow path, the first communication liquid chamber 612 which is a communication liquid chamber communicating with the flow path, and the first pressure receiving body 63 which is a pressure receiving body which converts a pressure difference between a pressure of the first communication liquid chamber 612 and a reference pressure into an operating force of the valve, in which a threshold pressure of the first communication liquid chamber 612 which determines opening/closing of the valve is variable.

It is possible to render the pressure of the liquid supplied downstream of the first valve mechanism 6 variable by configuring the threshold pressure of the first communication liquid chamber 612 to be variable as described above, and it is possible to easily perform the pressure control. According to the first valve mechanism 6, it is not necessary to detect the pressure of the liquid downstream of the first valve mechanism 6 or to control the pressurizing unit 5 based on the detected pressure, it is possible to simplify the configuration, and it is possible to suppress pulsation or the like of the pressurizing unit 5.

The second valve mechanism 8 which is the valve mechanism of the present embodiment is used for a flow path coupled to the liquid ejecting head 1 that ejects a liquid includes the second valve body 85 and the second valve seat 86 which are a valve which opens/closes the flow path, the second communication liquid chamber 812 which is a communication liquid chamber communicating with the flow path, and the second pressure receiving body 83 which is a pressure receiving body which converts a pressure difference between a pressure of the second communication liquid chamber 812 and a reference pressure into an operating force of the valve, in which a threshold pressure of the second communication liquid chamber 812 which determines opening/closing of the valve is variable.

It is possible to render the pressure of the liquid supplied downstream of the second valve mechanism 8 variable by configuring the threshold pressure of the second communication liquid chamber 812 to be variable as described above, and it is possible to easily perform the pressure control. According to the second valve mechanism 8, it is not necessary to detect the pressure of the liquid upstream of the second valve mechanism 8 or to control the pressurizing unit 5 based on the detected pressure, it is possible to simplify the configuration, and it is possible to suppress pulsation or the like of the pressurizing unit 5.

It is preferable that the first valve mechanism 6 which is the valve mechanism of the present embodiment further include the first air chamber 61B which is an air chamber, a volume of which changes according to an operation of the first pressure receiving body 63 which is the pressure receiving body, and the first opening/closing mechanism 100 which is an opening/closing mechanism which opens/closes the first air chamber 61B for atmosphere communication, in which a pressure of the first air chamber 61B is set to the reference pressure. Accordingly, it is possible to adjust the reference pressure inside the first air chamber 61B to change the threshold pressure inside the first communication liquid chamber 612 by opening/closing the first opening/closing mechanism 100.

It is preferable that the second valve mechanism 8 which is the valve mechanism of the present embodiment further include the second air chamber 81B which is an air chamber, a volume of which changes according to an operation of the second pressure receiving body 83 which is the pressure receiving body, and the second opening/closing mechanism 200 which is an opening/closing mechanism which opens/closes the second air chamber 81B for atmosphere communication, in which a pressure of the second air chamber 81B is used as the reference pressure. Accordingly, it is possible to adjust the reference pressure inside the second air chamber 81B to change the threshold pressure inside the second communication liquid chamber 812 by opening/closing the second opening/closing mechanism 200.

In the first valve mechanism 6 which is the valve mechanism of the present embodiment, it is preferable that the first air chamber 61B which is the air chamber be configured to have a variable volume independent of the operation of the first pressure receiving body 63 which is the pressure receiving body. Accordingly, by changing the volume inside the first air chamber 61B, it is possible to change the pressure fluctuation inside the first air chamber 61B with respect to the movement of the first pressure receiving body 63 when the first opening/closing mechanism 100 is closed, and it is possible to render the threshold pressure inside the first communication liquid chamber 612 that determines the opening/closing of the valve variable.

In the second valve mechanism 8 which is the valve mechanism of the present embodiment, it is preferable that the second air chamber 81B which is the air chamber be configured to have a variable volume independent of the operation of the second pressure receiving body 83 which is the pressure receiving body. Accordingly, by changing the volume inside the second air chamber 81B, it is possible to change the pressure fluctuation inside the second air chamber 81B with respect to the movement of the second pressure receiving body 83 when the second opening/closing mechanism 200 is closed, and it is possible to render the threshold pressure inside the second communication liquid chamber 812 that determines the opening/closing of the valve variable.

It is preferable that the first valve mechanism 6 which is the valve mechanism of the present embodiment further include the first buffer chamber 111 which is a buffer chamber communicating with the first air chamber 61B which is the air chamber, and the first movable wall 112 which is a movable wall that is configured to form a portion of a wall of the first buffer chamber 111 and change the volume of the first buffer chamber 111. Accordingly, by moving the first movable wall 112, it is possible to change the volume of the first buffer chamber 111 and it is possible to change the actual volume of the first air chamber 61B communicating with the first buffer chamber 111.

It is preferable that the second valve mechanism 8 which is the valve mechanism of the present embodiment further include the second buffer chamber 211 which is a buffer chamber communicating with the second air chamber 81B which is the air chamber, and the second movable wall 212 which is a movable wall that is configured to form a portion of a wall of the second buffer chamber 211 and change the volume of the second buffer chamber 211. Accordingly, by moving the second movable wall 212, it is possible to change the volume of the second buffer chamber 211 and it is possible to change the actual volume of the second air chamber 81B communicating with the second buffer chamber 211.

In the first valve mechanism 6 that is the valve mechanism of the present embodiment, it is preferable that the first pressure receiving body 63 which is the pressure receiving body be configured to include a bellowphragm. In the present embodiment, the first pressure receiving body 63 includes the first flexible portion 632 which is a flexible film having, as the bellowphragm, a structure in which the first pressure receiving body 63 is folded back in a direction in which spaces partitioned by the first pressure receiving body 63 are lined up. By providing the first flexible portion 632 on the first pressure receiving body 63 in this manner, it is possible to greatly deform the first flexible portion 632 with a small force to greatly move the first pressure receiving body 63.

In the second valve mechanism 8 which is the valve mechanism of the present embodiment, the second pressure receiving body 83 which is a pressure receiving body includes, in the present embodiment configured to include a bellowphragm, the second flexible portion 832 which is a flexible film having, as the bellowphragm, a structure in which the second pressure receiving body 83 is folded back in a direction in which the space partitioned by the second pressure receiving body 83 is lined up. By providing the second flexible portion 832 on the second pressure receiving body 83 in this manner, it is possible to deform the first flexible portion 632 with a small force to greatly move the first pressure receiving body 63.

It is preferable that the first valve mechanism 6 which is the valve mechanism of the present embodiment further include the first elastic body 120 which is an elastic body which generates a biasing force in a direction of opening or closing the valve according to a deformation amount, and the first support member 121 which is a support member which supports the first elastic body 120 such that the displacement amount of the first elastic body 120 is variable. Accordingly, by changing the displacement amount of the first elastic body 120 using the first support member 121, it is possible to adjust the biasing force by which the first elastic body 120 biases the first pressure receiving body 63 to vary the threshold pressure inside the first communication liquid chamber 612 which determines the opening/closing of the valve.

It is preferable that the second valve mechanism 8 which is the valve mechanism of the present embodiment further include the second elastic body 220 which is an elastic body which generates a biasing force in a direction of opening or closing the valve according to a deformation amount, and the second support member 221 which is a support member which supports the second elastic body 220 such that the displacement amount of the second elastic body 220 is variable. Accordingly, by changing the displacement amount of the second elastic body 220 using the second support member 221, it is possible to adjust the biasing force by which the second elastic body 220 biases the second pressure receiving body 83 to vary the threshold pressure inside the second communication liquid chamber 812 which determines the opening/closing of the valve.

A liquid ejecting system of the present embodiment includes the liquid ejecting head 1 which ejects a liquid, a circulation flow path formed together with a flow path inside the liquid ejecting head 1, and a valve mechanism provided in the middle of the circulation flow path, in which the liquid ejecting system includes the first valve mechanism 6 provided in the supply flow path 3 which is an upstream flow path positioned upstream of the liquid ejecting head 1 to open/close a valve at the first threshold pressure P1 or P1', and the second valve mechanism 8 provided in the recovery flow path 4 which is a downstream flow path positioned downstream of the liquid ejecting head 1 to open/close the valve at the second threshold pressure P2 or P2' which is lower than the first threshold pressure P1 or P1'.

In the liquid ejecting system of the present embodiment, it is preferable that the first valve mechanism 6 be configured to be capable of selecting between a normal mode in which the valve is opened/closed at the first threshold pressure P1 or P1' and a boost mode in which the valve is opened/closed at the third threshold pressure P3 or the fourth threshold pressure P4 which is a threshold pressure higher than the first threshold pressure P1 or P1', and the second valve mechanism 8 is configured to be capable of selecting between a normal mode in which the valve is opened/closed at the second threshold pressure P2 or P2' and a boost mode in which the valve is opened/closed at the fifth threshold pressure P5 or the sixth threshold pressure P6 which is a threshold pressure lower than the second threshold pressure P2 or P2'. Accordingly, the first valve mechanism 6 is capable of increasing the supply pressure at which the liquid is supplied in the boost mode as compared to the pressure at which the liquid is supplied in the normal mode. Accordingly, the second valve mechanism 8 is capable of lowering the pressure at which the liquid is recovered in the boost mode as compared to the pressure at which the liquid is recovered in the normal mode. Therefore, by combining the normal mode and the boost mode, it is possible to cause the liquid ejecting head 1 to over-pressurize, over-depressurize, and circulate at high speed the liquid.

In the liquid ejecting system of the present embodiment, it is preferable that, during a normal operation of the liquid ejecting head 1, both the first valve mechanism 6 and the second valve mechanism 8 be set to the normal mode, and during a first maintenance operation of the liquid ejecting head 1, the first valve mechanism 6 be set to the normal mode and the second valve mechanism 8 be set to the boost mode. Accordingly, by performing the first maintenance operation, it is possible to increase the pressure at which the liquid is supplied to the liquid ejecting head to perform the over-pressurization.

In the liquid ejecting system of the present embodiment, it is preferable that, during a normal operation of the liquid ejecting head 1, both the first valve mechanism 6 and the second valve mechanism 8 be set to the normal mode, and during a second maintenance operation of the liquid ejecting head 1, the first valve mechanism 6 be set to the boost mode and the second valve mechanism 8 be set to the normal mode. Accordingly, by performing the second maintenance operation, it is possible to increase the pressure at which the liquid is recovered from the liquid ejecting head to perform the over-depressurization.

In the liquid ejecting system of the present embodiment, it is preferable that, during a normal operation of the liquid ejecting head 1, both the first valve mechanism 6 and the second valve mechanism 8 be set to the normal mode, and during a third maintenance operation of the liquid ejecting head 1, the first valve mechanism 6 be set to the boost mode and the second valve mechanism 8 be set to the boost mode. Accordingly, by performing the third maintenance operation, it is possible to increase the pressure at which the liquid is supplied to the liquid ejecting head and the pressure at which the liquid is collected from the liquid ejecting head and to perform high-speed circulation of the liquid between the liquid storage portion 2 and the liquid ejecting head 1.

Other Embodiments

As described above, although a description is given of an embodiment of the present disclosure, the basic configuration of the present disclosure is not limited to that described above.

In the first embodiment described above, although one liquid ejecting head 1 is provided in the liquid ejecting system, the number of the liquid ejecting heads 1 is not limited thereto and a plurality of two or more liquid ejecting heads 1 may be provided. When a plurality of liquid ejecting heads 1 is provided in the liquid ejecting system, the supply flow path 3 may be branched and the first valve mechanism 6 may be provided for each liquid ejecting head 1. When a plurality of liquid ejecting heads 1 is provided in the liquid ejecting system, the recovery flow path 4 may be branched and the second valve mechanism 8 may be provided for each liquid ejecting head 1, or the second valve mechanism 8 may be provided to be shared by the plurality of liquid ejecting heads 1.

In the first embodiment described above, although a description is given of the liquid ejecting system that circulates the liquid between the liquid ejecting head 1 and the liquid storage portion 2, the first valve mechanism 6 of the present disclosure may also be applied to a liquid ejecting system that does not circulate liquid between the liquid ejecting head 1 and the liquid storage portion 2.

In the first embodiment described above, although a description is given using the actuator 16 formed of the piezoelectric actuator as the pressure generating unit which causes pressure changes in the liquid inside the pressure chamber 14, the configuration is not particularly limited thereto, and it is possible to use, as the pressure generating unit, a pressure generating unit in which a heating element is disposed inside a pressure generating chamber and a droplet is discharged from the nozzle by a bubble generated by the heating of the heating element, a so-called electrostatic actuator which generates static electricity between the diaphragm and an electrode and deforms a diaphragm using the electrostatic force to discharge a droplet from the nozzle, or the like.

Furthermore, the present disclosure widely and generally targets liquid ejecting systems including liquid ejecting heads. For example, it is possible to apply the present disclosure to a liquid ejecting system including recording heads such as various ink jet recording heads used in an image recording apparatus such as a printer, a color material ejecting head used in the manufacture of color filters of liquid crystal displays and the like, an electrode material ejecting head used in the electrode formation of organic EL displays, field emission displays (FED) and the like, and a biogenic and organic matter ejecting head used in the manufacture of biochips.

What is claimed is:

1. A liquid ejecting system comprising:
   An ink jet liquid ejecting head that ejects a liquid;
   a circulation flow path formed together with a flow path inside the inkjet liquid ejecting head; and
   a valve mechanism provided in the flow path, comprising:
      a valve that opens/closes the flow path;
      a communication liquid chamber that communicates with the flow path; and
      a pressure receiving body that converts a pressure difference between a pressure of the communication liquid chamber and a reference pressure into an operating force of the valve, wherein
      a threshold pressure of the communication liquid chamber for determining opening/closing of the valve is variable.

2. The liquid ejecting system according to claim 1, the valve mechanism further comprising:
   an air chamber, a volume of which changes according to an operation of the pressure receiving body; and
   an opening/closing mechanism that opens/closes the air chamber for atmosphere communication, wherein
   a pressure of the air chamber is used as the reference pressure.

3. The liquid ejecting system according to claim 2, wherein
   the air chamber is configured to have a variable volume independent of the operation of the pressure receiving body.

4. The liquid ejecting system according to claim 3, the valve mechanism further comprising:
   a buffer chamber that communicates with the air chamber; and
   a movable wall configured to form a portion of a wall of the buffer chamber and to change a volume of the buffer chamber.

5. The liquid ejecting system according to claim 1, wherein
the pressure receiving body is configured to include a bellowphragm.

6. The liquid ejecting system according to claim 1, the valve mechanism further comprising:
an elastic body that generates a biasing force in a direction of opening or closing the valve according to a deformation amount; and
a support member that supports the elastic body such that a displacement amount of the elastic body is variable.

7. A liquid ejecting system comprising:
a liquid ejecting head that ejects a liquid;
a circulation flow path formed together with a flow path inside the liquid ejecting head; and
a valve mechanism provided in a middle of the circulation flow path, wherein
the valve mechanism includes
a first valve mechanism that is provided in an upstream flow path positioned upstream of the liquid ejecting head and that opens/closes a valve at a first threshold pressure, and
a second valve mechanism that is provided in a downstream flow path positioned downstream of the liquid ejecting head and that opens/closes the valve at a second threshold pressure lower than the first threshold pressure.

8. The liquid ejecting system according to claim 7, wherein
the first valve mechanism is configured to select between a first normal mode in which the valve is opened/closed at the first threshold pressure and a first boost mode in which the valve is opened/closed at a threshold pressure higher than the first threshold pressure, and
the second valve mechanism is configured to select between a second normal mode in which the valve is opened/closed at the second threshold pressure and a second boost mode in which the valve is opened/closed at a threshold pressure lower than the second threshold pressure.

9. The liquid ejecting system according to claim 8, wherein
during a normal operation of the liquid ejecting head, both the first valve mechanism and the second valve mechanism are set to the normal mode, and
during a first maintenance operation of the liquid ejecting head, the first valve mechanism is set to the normal mode and the second valve mechanism is set to the boost mode.

10. The liquid ejecting system according to claim 8, wherein
during a normal operation of the liquid ejecting head, both the first valve mechanism and the second valve mechanism are set to the normal mode, and
during a second maintenance operation of the liquid ejecting head, the first valve mechanism is set to the boost mode and the second valve mechanism is set to the normal mode.

11. The liquid ejecting system according to claim 8, wherein
during a normal operation of the liquid ejecting head, both the first valve mechanism and the second valve mechanism are set to the normal mode, and
during a third maintenance operation of the liquid ejecting head, the first valve mechanism is set to the boost mode and the second valve mechanism is set to the boost mode.

* * * * *